United States Patent
Adachi et al.

(10) Patent No.: US 9,162,594 B2
(45) Date of Patent: Oct. 20, 2015

(54) VEHICLE SEAT

(75) Inventors: Takamasa Adachi, Tochigi (JP); Hiroyuki Kaku, Tochigi (JP); Takayuki Inoue, Tochigi (JP); Yutaka Kizawa, Tochigi (JP); Akimitsu Kurihara, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 180 days.

(21) Appl. No.: 13/811,507

(22) PCT Filed: Jul. 21, 2011

(86) PCT No.: PCT/JP2011/066617
§ 371 (c)(1),
(2), (4) Date: Jan. 22, 2013

(87) PCT Pub. No.: WO2012/011542
PCT Pub. Date: Jan. 26, 2012

(65) Prior Publication Data
US 2013/0119724 A1    May 16, 2013

(30) Foreign Application Priority Data

| Jul. 21, 2010 | (JP) | 2010-164339 |
| Jul. 21, 2010 | (JP) | 2010-164340 |
| Jul. 21, 2010 | (JP) | 2010-164341 |

(51) Int. Cl.
*B60N 2/42*    (2006.01)
*B60N 2/427*   (2006.01)

(52) U.S. Cl.
CPC .......... *B60N 2/4228* (2013.01); *B60N 2/42745* (2013.01)

(58) Field of Classification Search
CPC .......................... B60N 2/4885; B60N 2/42709
USPC ........................... 297/216.12, 216.13
See application file for complete search history.

(56) References Cited

U.S. PATENT DOCUMENTS

| 6,991,287 | B1 * | 1/2006 | Ogawa et al. | 297/216.12 |
| 7,393,052 | B2 * | 7/2008 | Humer et al. | 297/216.12 |

(Continued)

FOREIGN PATENT DOCUMENTS

| JP | 3687493 B2 | 8/2005 |
| JP | 2007-062522 A | 3/2007 |

(Continued)

OTHER PUBLICATIONS

Office Action issued for JP 2010-164340 (Jun. 24, 2014).

*Primary Examiner* — David R Dunn
*Assistant Examiner* — Alexander Harrison
(74) *Attorney, Agent, or Firm* — Drinker Biddle & Reath LLP

(57) ABSTRACT

Provided is a vehicle seat by which an impact of rear end collision is reduced and of which peripheral structure of a side frame is simplified. A vehicle seat includes: a seat back frame which includes side portions positioned at the sides thereof, a pressure receiving member which is jointed to the seat back frame through joint members and supports an occupant, and an impact reduction member which is disposed on at least one of the side portions to engage with the joint member and to move by a predetermined amount of impact load applied to the pressure receiving member so that the pressure receiving member is caused to move rearward; in which the side portion includes a convex portion protruding in the movement range of the impact reduction member, and the impact reduction member abuts against the convex portion so that the movement of the impact reduction member is prevented.

16 Claims, 16 Drawing Sheets

(56) References Cited

U.S. PATENT DOCUMENTS

| | | | |
|---|---|---|---|
| 7,644,987 B2 * | 1/2010 | Humer et al. | 297/216.12 |
| 7,677,657 B2 * | 3/2010 | Park et al. | 297/216.12 |
| 7,758,114 B2 * | 7/2010 | Yokota et al. | 297/216.12 |
| 7,967,380 B2 * | 6/2011 | Omori et al. | 297/284.4 |
| 8,678,495 B2 * | 3/2014 | Omori et al. | 297/216.12 |
| 2004/0075312 A1 * | 4/2004 | Neale | 297/216.12 |
| 2005/0280296 A1 * | 12/2005 | Ohchi et al. | 297/216.12 |
| 2006/0006709 A1 * | 1/2006 | Uno et al. | 297/216.12 |
| 2006/0202524 A1 * | 9/2006 | Yamaguchi | 297/216.12 |
| 2008/0036250 A1 * | 2/2008 | Kim | 297/216.12 |
| 2008/0073951 A1 * | 3/2008 | Hattori et al. | 297/216.12 |
| 2008/0265637 A1 * | 10/2008 | Niitsuma et al. | 297/216.12 |
| 2009/0001785 A1 * | 1/2009 | Swan et al. | 297/216.12 |
| 2009/0167066 A1 * | 7/2009 | Mori et al. | 297/216.12 |
| 2009/0309398 A1 * | 12/2009 | Niitsuma et al. | 297/216.12 |
| 2009/0322127 A1 * | 12/2009 | Michalak et al. | 297/216.12 |
| 2010/0001562 A1 * | 1/2010 | Sayama | 297/216.12 |
| 2010/0007183 A1 * | 1/2010 | Akutsu | 297/216.12 |
| 2010/0026060 A1 * | 2/2010 | Niitsuma et al. | 297/216.12 |
| 2010/0060047 A1 * | 3/2010 | Furuta et al. | 297/216.12 |
| 2010/0148545 A1 * | 6/2010 | Omori | 297/216.12 |
| 2010/0156154 A1 * | 6/2010 | Humer et al. | 297/216.12 |
| 2010/0176630 A1 * | 7/2010 | Nitsuma | 297/216.13 |
| 2010/0181810 A1 * | 7/2010 | Yasuda et al. | 297/216.12 |
| 2010/0181812 A1 * | 7/2010 | Nitsuma | 297/216.13 |
| 2010/0187874 A1 * | 7/2010 | Matsui | 297/216.12 |
| 2010/0187876 A1 * | 7/2010 | Nitsuma | 297/216.13 |
| 2010/0264704 A1 * | 10/2010 | Yasuda et al. | 297/216.12 |
| 2010/0270834 A1 * | 10/2010 | Niitsuma | 297/216.12 |
| 2010/0320817 A1 * | 12/2010 | Humer et al. | 297/216.12 |
| 2011/0012401 A1 * | 1/2011 | Omori | 297/216.12 |
| 2011/0018317 A1 * | 1/2011 | Omori | 297/216.12 |
| 2011/0074191 A1 * | 3/2011 | Omori | 297/216.12 |
| 2011/0140487 A1 * | 6/2011 | Omori | 297/216.12 |
| 2011/0187167 A1 * | 8/2011 | Takayasu et al. | 297/216.12 |
| 2011/0193377 A1 * | 8/2011 | Niitsuma et al. | 297/216.12 |
| 2011/0193379 A1 * | 8/2011 | Nitsuma | 297/216.14 |
| 2011/0210587 A1 * | 9/2011 | Omori et al. | 297/216.12 |
| 2011/0210588 A1 * | 9/2011 | Omori et al. | 297/216.12 |
| 2011/0272978 A1 * | 11/2011 | Nitsuma | 297/216.12 |
| 2011/0278886 A1 * | 11/2011 | Nitsuma | 297/216.13 |
| 2012/0112504 A1 * | 5/2012 | Humer et al. | 297/216.12 |
| 2012/0126593 A1 * | 5/2012 | Niitsuma et al. | 297/216.12 |
| 2012/0126594 A1 * | 5/2012 | Niitsuma et al. | 297/216.12 |
| 2012/0133181 A1 * | 5/2012 | Omori et al. | 297/216.12 |
| 2012/0256454 A1 * | 10/2012 | Humer et al. | 297/216.12 |
| 2012/0299343 A1 * | 11/2012 | Yasuda et al. | 297/216.12 |
| 2013/0076087 A1 * | 3/2013 | Niitsuma et al. | 297/216.12 |
| 2013/0229039 A1 * | 9/2013 | Humer et al. | 297/216.12 |

FOREIGN PATENT DOCUMENTS

| | | |
|---|---|---|
| JP | 2009-023517 A | 2/2009 |
| JP | 2009-090808 A | 4/2009 |
| JP | 2010-018190 A | 1/2010 |

* cited by examiner

VEHICLE SEAT

CROSS REFERENCE TO RELATED APPLICATIONS

This application is the U.S. national phase of the International Patent Application No. PCT/JP2011/066617, filed Jul. 21, 2011, which claims the benefit of Japanese Patent Application No. 2010-164339, filed Jul. 21, 2010, Japanese Patent Application No. 2010-164340, filed Jul. 21, 2010, and Japanese Patent Application No. 2010-164341, filed Jul. 21, 2010, the entire content of all being incorporated herein by reference.

BACKGROUND

Disclosed herein is a vehicle seat, and particularly, a vehicle seat which reduces an impact of rear end collision and simplifies a peripheral structure of a side frame.

In general, in a case where a so-called rear end collision occurs when a rear portion of an automobile or the like collides with something or the rear portion thereof largely collides with something when traveling rearward, a head of an occupant sitting on a seat is suddenly inclined backward by the inertia force, and hence some stress may occur on the occupant's neck.

For this reason, the vehicle seat of the automobile or the like is conventionally equipped with a headrest which is provided above a seat back and receives the occupant's head from the rear side so that the occupant's head or neck is protected from an impact load generated by the rear end collision and the stress on the neck is reduced.

However, the headrest alone may not reduce the impact load applied to the human body. Then, when a gap between the occupant's head and the headrest is not promptly removed during the rear end collision, it is difficult to sufficiently reduce the impact applied to the neck.

In order to solve such a problem, there is known a technique of effectively reducing an impact by sufficiently sinking an occupant into a seat back in the event of rear end collision, where a movable link member is disposed in a side frame of a seat back frame provided with a pressure receiving member which receives the occupant's load, and a pressure receiving member is attached to the link member through a joint member (refer to Japanese Patent Document No. 2009-023517 A ("the '517 Document")).

The seat back frame disclosed in the '517 Document may sufficiently sink the occupant into the seat back frame in a manner such that the pressure receiving member receives the occupant's rearward movement in the event of the rear end collision so that the link member pivots. Then, since the link member is provided with a biasing element and the pivoting of the pressure receiving member is normally suppressed by the biasing element, the sensation of sitting on the seat is not degraded. Then, a plurality of stoppers that adjust the movement allowing range of the link member are arranged around the link member, and hence the range of sinking the occupant may be adjusted.

In the technique of The '517 Document, the stoppers are provided at two positions on the side frame. Among the two stoppers, the first stopper is used to regulate the link member at the initial position before the pivoting and the second stopper is used to regulate the link member at the stop position after the pivoting.

Accordingly, in the seat back frame disclosed in The '517 Document, a plurality of members are intensively arranged around the side frame. In this way, when many members are arranged around the side frame, the structure becomes complex due to the large number of arranged components, and hence a problem arises in that some time is taken for the attachment operation during assembly. Further, when the stoppers are provided in the side frame, there is a need to ensure a comparatively large space around the link member, and hence a problem arises in that a degree in freedom in design is degraded.

Further, in the seat back frame disclosed in The '517 Document, the pressure receiving member receives the occupant's rearward movement in the event of the rear end collision, and the joint member (the wire) attached to the pressure receiving member also receives the rearward tension. Then, since the joint member receives the rearward tension, the link member which is attached to the side of the side frame in the joint member pivots.

Then, in the technique disclosed in The '517 Document, the joint member is hooked to a hole which is formed by an elongated hole provided in the link member. Then, when the rear end collision occurs, the pressure receiving member receives a large load for a relatively short time by the occupant's rearward movement, and the load is transmitted to the link member through the joint member. Accordingly, when the occupant's rearward movement is received in the event of the rear end collision, the joint member hooked to the link member pivots, and hence a problem arises in that the hooked portion of the joint member separates from the hole of the link member.

The joint member and the link member may not be completely anchor-jointed to each other since the link member needs to pivot in the event of the rear end collision, and the joint member needs to slide on the link member. Accordingly, the joint member may be swaged to the link member, but since the number of components increases, the workability during the attachment operation is degraded. Accordingly, there has been a demand for a technique of preventing the easy separation of the joint member by suppressing the pivoting of the joint member attached to the impact reduction member (the link member) with a simple configuration.

SUMMARY

It is an object of various embodiments of the present invention to provide a vehicle seat which includes an impact reduction member maintaining the vehicle seat in an optimal state relative to a normal sitting load or rear end collision, simplifies a structure by decreasing the number of components, decreases the size and weight, improves workability in the assembling operation, and ensures a degree in freedom in design. Further, it is another object to provide a vehicle seat capable of stably preventing a movement of an impact reduction member (a link member) with a simple configuration. Furthermore, it is still another object to provide a vehicle seat which includes an impact reduction member capable of stably supporting an occupant's body in the event of rear end collision by preventing the easy separation of a joint member, and has satisfactory workability in the assembling operation without adopting a complex configuration.

The aforementioned problems are solved by a vehicle seat according to various embodiments of the present invention including: a seat back frame that includes a side portion positioned at the side thereof, a pressure receiving member that is jointed to the seat back frame through a joint member and supports an occupant, and an impact reduction member that is disposed at least one side of the side portion and engages with the joint member to be movable when a predetermined amount of impact load is applied to the pressure receiving member and cause the pressure receiving member to move rearward; in which the side portion includes a convex portion which is bulged in a movement range of the impact reduction member, and the impact reduction member abuts against the convex portion so that the movement thereof is prevented.

In this way, the vehicle seat includes the pressure receiving member which is jointed to the moving impact reduction member. Accordingly, since the occupant's body is sunk rearward in the event of the rear end collision, the load applied to the occupant may be effectively reduced.

Then, since the impact reduction member abuts against the convex portion provided in the side frame so that the movement thereof is prevented, the number of components may be decreased compared to the case where the movement is prevented by separately providing the movement preventing member (for example, the stopper pin or the like) in the seat back frame. Then, since the number of components decreases, the peripheral configuration of the impact reduction member is simplified, the vehicle seat may be decreased in size and weight, and the workability in the assembling operation is improved.

Further, it is preferable for the side portion to include a flat side plate, and for the impact reduction member to be provided with a base portion which makes a slide contact with the side plate and a protruded piece which protrudes from the base portion and is bent toward the side plate to engage with the convex portion.

In this way, since the protruded piece is integrally formed with the impact reduction member and the protruded piece is bent toward the side portion provided with the convex portion, the impact reduction member may reliably abut against the convex portion. Further, since the protruded piece is integrally formed with the member constituting the impact reduction member, the complex configuration may be prevented. As a result, the impact reduction member may be easily attached to the side portion.

In addition, it is preferable for the side portion to further include a front edge which is bent inwardly in the lateral direction from the front end of the side plate or a rear edge which is bent inwardly from the rear end of the side plate in the lateral direction, for the convex portion to include a slope portion which is formed inwardly in a raised manner in the lateral direction from the side plate in the lateral direction, and for a part of the slope portion to be formed to be continuous to the front edge or the rear edge.

In this way, since the side portion is provided with the inward bent portion (the front edge and the rear edge), the rigidity of the side portion is improved. Further, since the slope portion forming the convex portion is disposed in the front edge and the rear edge of the side portion (or the vicinity of the front edge and the rear edge of the side portion), the rigidity of the convex portion (the slope portion) may be improved. Then, since the protruded piece abuts against the convex portion with a high rigidity, the impact reduction member may reliably be pressed and stopped without movement of the impact reduction member in a desired range or more.

In this case, it is preferable for a stopper portion to be formed by an elongated hole formed at an engagement portion with the protruded piece in the convex portion.

In this way, since the stopper portion as the elongated hole is formed by notching the engagement portion with the protruded piece in the convex portion, the protruded piece may easily engage with the stopper portion and even when a large load is applied in a direction in which the impact reduction member moves, the protruded piece is not easily separated from the stopper portion. Accordingly, the movement of the impact reduction member is reliably prevented without causing a problem in which the protruded piece gets on the convex portion so that the impact reduction member moves to the set range or more. As a result, the movement range of the impact reduction member may be accurately set.

Further, it is preferable for the convex portion to further include a hole which is separated from the stopper portion.

In this way, since the hole is further provided at a position separated from the stopper engagement portion with the protruded piece of the impact reduction member in the convex portion, the convex portion, the stopper portion, and the like, may be easily formed and hence the formability is improved. Further, since a large area is notched in the side portion, the weight of the side portion may be decreased.

Moreover, it is preferable for the convex portion to include a planar portion which is perpendicular to the movement range of the impact reduction member, and for the impact reduction member to be disposed to abut against the planar portion.

In this way, when the planar portion is provided to be perpendicular to the movement range of the impact reduction member in the convex portion and the planar portion abuts against the impact reduction member, the contact area between the impact reduction member and the convex portion increases. As a result, the impact reduction member may stably move without causing displacement upon movement. Further, since the contact area between the impact reduction member and the convex portion increases, the friction acting between the impact reduction member and the convex portion increases, and hence the impact reduction member may not easily move beyond necessity. Accordingly, the movement of the impact reduction member may be pressed and stopped only by the protruded piece, and also the movement of the impact reduction member may easily be pressed and stopped. As a result, the movement range of the impact reduction member may further be reliably limited without increasing the number of components.

Further, in this case, it is preferable for the impact reduction member to further include a locking portion which is hooked to the joint member and a pivoting suppressing portion which abuts against the joint member to suppress the pivoting of the joint member.

In this way, the joint member which supports the pressure receiving member is hooked to the impact reduction member, and the pressure receiving member receives the load generated by the rearward movement of the occupant's body in the event of the rear end collision to transmit the load to the impact reduction member through the joint member. Then, the impact reduction member moves rearward by the load, so that the occupant's body may be sunk rearward.

In this case, the joint member which is hooked to the locking portion of the impact reduction member abuts against the pivoting suppressing portion provided in the impact reduction member to engage therewith, thereby stopping the pivoting or the movement thereof. As a result, the joint member which receives a large load largely moves and pivots in the event of the rear end collision, so that the separation thereof from the impact reduction member may be suppressed.

Accordingly, even when a large load is generated in the event of the rear end collision, the joint member is not easily separated from the impact reduction member, and hence the occupant's body may be stably and reliably supported.

Further, it is preferable for the joint member to include a hook end which is formed by bending one end which is hooked to the impact reduction member, for the locking portion to be formed by an elongated hole through which the hook end is inserted, and for the pivoting suppressing portion to abut against the hook end.

In this way, since the end engaging with the impact reduction member of the joint member supporting the pressure receiving member is bent into a hook shape, the joint member may be easily locked to the impact reduction member. As a result, it is possible to suppress the joint member from being separated from the impact reduction member. Further, when the locking portion is formed in the elongated hole shape to insert the hook end therethrough, the hook end may be easily hooked to the locking portion, and hence the assembling operation may be simplified.

In addition, it is preferable for the pivoting suppressing portion to protrude from a formation portion provided with the locking portion.

With such a configuration, there is no need to provide a separate member relative to the impact reduction member and to increase the number of components, and the workability in the assembling operation is not degraded. Further, since the pivoting suppressing portion is disposed around the locking portion for hooking the joint member thereto, the pivoting suppressing portion may easily abut against the joint member and the peripheral structure of the pivoting suppressing portion does not increase in size. Accordingly, it is possible to reliably suppress the separation of the joint member with a compact configuration.

At this time, it is preferable for the pivoting suppressing portion to be bent toward the hook end.

In this way, since the pivoting suppressing portion is provided near the hook end provided at the end of the joint member, the pivoting suppressing portion may further reliably abut against the hook end. As a result, since the pivoting suppressing portion presses and stops the hook end even when the joint member pivots, it is possible to suppress the joint member from being separated from the impact reduction member.

Further, it is preferable for the pivoting suppressing portion to be formed relative to the hook end to be formed at the pivoting side of the hook end upon the movement of the impact reduction member.

When a large load is applied to the pressure receiving member in the event of the rear end collision, the load is also transmitted to the joint member. As a result, the hook end of the joint member easily pivots about the bent point. Accordingly, since the pivoting suppressing portion is provided in the pivoting direction and the pivoting suppressing portion abuts against the hook end to suppress the pivoting of the hook end, it is possible to further reliably suppress the separation of the joint member from the impact reduction member.

In addition, it is preferable for the seat back frame to further include a frame member that joints the upper parts of the side portion to each other and is disposed along the side portion in the vertical direction in an overlapped manner therewith, and for the impact reduction member to abut against the frame member so that the movement thereof is prevented.

In this way, in the vehicle seat, since the impact reduction member abuts against the frame member constituting the seat back frame to prevent the movement thereof, the number of components may be decreased compared with the case where the movement is prevented by separately providing the movement preventing member (for example, the stopper pin or the like) in the seat back frame. Then, since the number of components decreases, the peripheral configuration of the impact reduction member is simplified, the vehicle seat may decrease in the size and weight, and the workability in the assembling operation is improved.

Further, in the vehicle seat, the impact reduction member abuts against the frame member constituting the seat back frame to prevent the movement thereof. Since a material with high rigidity is used in the frame member constituting the seat back frame, it is possible to prevent the movement by the member with high rigidity. As a result, the movement of the impact reduction member may be reliably and stably prevented.

In addition, in the vehicle seat, the frame member jointing the side portions extends downward to overlap with the side portions. With this configuration, even when a large load is applied in the lateral direction in the event of the side collision or the like, it is possible to receive the load and transmit the load to the vehicle body due to the rigidity relative to the load.

In addition, it is preferable for the side portion to include a flat side plate, and for an impact reduction member to be provided with a base portion which makes a slide contact with the side plate, and for a movement preventing portion which protrudes from the base portion to be bent in a raised manner from the side plate and abut against the frame member to be formed.

With such a configuration, it is possible to decrease the abutting area between the frame member and the impact reduction member (specifically, the movement preventing portion) during the movement of the impact reduction member.

Further, it is preferable for the frame member to be formed by a member having a closed cross-section.

In this way, since the frame member is formed by the member having the closed cross-sectional shape, the rigidity of the frame member is improved. As a result, since the rigidity of the portion abutting against the impact reduction member is also improved, it is possible to further reliably prevent the movement of the impact reduction member.

In addition, generally, the member having the closed cross-sectional shape has high resistance relative to the lateral load, the bending, or the torsion. Accordingly, since the frame member is formed in the closed cross-sectional shape, the rigidity relative to the load generated by the rear end collision and the side collision is improved, and hence such a load may be received.

In this case, it is preferable for the frame member to be formed by a tubular member having a circular cross-section, and for the movement preventing portion to extend inwardly in the lateral direction relative to the center axis of the tubular member disposed along the side portion after the movement of the impact reduction member.

In this way, since the frame member is formed by the tubular member having the circular cross-sectional shape, the rigidity of the frame member is improved. Further, since the end of the movement preventing portion is disposed at the inside exceeding the center axis of the tubular member, the movement preventing portion stably abuts against the frame member. As a result, since the movement preventing portion may be reliably pressed and stopped by the frame member, the movement range of the impact reduction member may accurately be set.

Further, it is preferable for the vehicle seat to further include a load input member that is disposed at the side of the seat back frame, in which the side portion may include a flat side plate and a front edge which is bent inwardly in the lateral direction from one end positioned at the front side of the side plate or a rear edge which is bent inwardly in the lateral direction from the other end positioned at the rear side of the side plate in the lateral direction, and a part of the load input member may be disposed at a position facing the front edge or the rear edge.

In this way, since the load input member is provided at the side of the seat back frame, the vehicle seat may transmit the load applied from the other member to the member constituting the seat frame, and hence the rigidity to the load is improved. Further, since the pressure receiving member jointed to the moving impact reduction member is provided, the vehicle seat receives the load generated by the side collision or the like, transmits the load to the member constituting the seat frame, and further sinks the occupant's body rearward in the event of the rear end collision. Accordingly, it is possible to effectively reduce the load applied to the occupant.

Then, since the front edge or the rear edge is formed by bending the front end or the rear end in the side portion inward and the load input member is disposed to face the front edge or the rear edge in a substantially flushed state, the vehicle seat including the load input member improves the strength to the load applied in the lateral direction. Further, when the large load is generated by the side collision, the load is smoothly transmitted from the load input member to the rear edge of the side portion, and hence the strength to the load applied in the lateral direction is improved.

According to the vehicle seat of an embodiment, since there is no need to separately provide the movement preventing member (for example, the stopper pin or the like) that limits the movement range of the impact reduction member, the number of components may be decreased. Then, since the configuration of preventing the movement of the impact reduction member is simplified, the workability in the assembling operation may be improved.

According to the vehicle seat of an embodiment, the protruded piece which is formed in the impact reduction member reliably abuts against the convex portion provided in the side portion, and hence the initial position of the impact reduction member may further reliably be regulated without increasing the number of components.

According to the vehicle seat of an embodiment, since the slope portion forming the convex portion is disposed in the front edge and the rear edge of the side portion, the rigidity of the convex portion is improved. As a result, since the protruded piece may abut against the portion with high rigidity, the movement of the impact reduction member may be strongly pressed and stopped.

According to the vehicle seat of an embodiment, since the protruded piece of the impact reduction member easily engages with the stopper portion formed by the elongated hole and hardly gets on the convex portion, it is possible to prevent the movement of the impact reduction member from exceeding the desired movement range.

According to the vehicle seat of an embodiment, the convex portion, the stopper portion, and the like may easily be formed in the side portion, and the formability is improved.

According to the vehicle seat of an embodiment, since the abutting area between the impact reduction member and the convex portion increases and the impact reduction member stably moves without any positional deviation, the movement range may reliably be limited.

According to the vehicle seat of an embodiment, since the pivoting of the joint member attached to the pressure receiving member is suppressed and the joint member is not easily separated from the impact reduction member, the occupant's body may be stably supported.

According to the vehicle seat of an embodiment, the separation of the joint member from the impact reduction member may be suppressed, the joint member is easily attached to the impact reduction member, and the workability when attaching the respective members is improved.

According to the vehicle seat of an embodiment, since there is no need to attach a separate member to suppress the separation of the joint member and the pivoting suppressing portion is provided around the joint member, the impact reduction member may be provided in a compact size.

According to the vehicle seat of an embodiment, since the pivoting suppressing portion provided in the impact reduction member easily abuts against the joint member, the separation of the joint member may be further reliably suppressed.

According to the vehicle seat of an embodiment, since the pivoting suppressing portion is formed in the pivoting direction of the hook end, the pivoting suppressing portion easily abuts against the joint member. As a result, the separation of the joint member may be reliably suppressed.

According to the vehicle seat of an embodiment, the movement of the impact reduction member may stably be prevented. Further, since there is no need to provide the movement preventing member (for example, the stopper pin or the like) that limits the movement range of the impact reduction member, the number of components may be decreased. Then, since the configuration of preventing the movement of the impact reduction member is simplified, the workability in the assembling operation may be improved.

According to the vehicle seat of an embodiment, the abutting area between the frame member and the impact reduction member (specifically, the movement preventing portion) during the movement of the impact reduction member may be decreased.

According to the vehicle seat of an embodiment, since the frame member having the closed cross-sectional shape is used, the movement of the impact reduction member may further reliably be prevented and the rigidity of the seat back frame to the load is improved.

According to the vehicle seat of an embodiment, the movement preventing portion of the impact reduction member reliably abuts against the frame member so that the movement of the impact reduction member may further reliably be pressed and stopped.

According to the vehicle seat of an embodiment, the strength to the load applied from the other member is improved, and hence the load applied from the other member may efficiently be received.

DETAILED DESCRIPTION

Hereinafter, an embodiment of the present invention will be described with reference to the drawings. Furthermore, the members, the arrangements, and the like described below do not limit the present invention, and may be modified into various forms depending on the spirit of the present invention. Further, in the present specification, the vehicle is a vehicle to be equipped with a seat, such as a ground traveling vehicle such as an automobile and a train having a vehicle wheel and an airplane or a ship moving in a place other than a ground. In addition, a general sitting load includes a sitting impact generated when sitting on a seat, an acceleration load generated upon sudden start-up of the vehicle, and the like. Moreover, rear end collision load is a large load generated by rear end collision, and indicates a large rear-end collision by a rear vehicle, a large collision when traveling backward, and the like. The rear end collision load does not include a load in a load region like the load generated upon normally seating on the seat.

Further, the lateral direction means the lateral direction of the vehicle directed forward, and is a direction which matches the width direction of a seat back frame 1 to be described later. Further, the front and rear direction indicates the front and rear direction while an occupant is seated on the seat.

FIGS. 1 to 8 illustrate an embodiment according to the present invention. FIGS. 9 to 16 illustrate another embodiment of the present invention.

Configuration of Vehicle Seat S

Hereinafter, an embodiment of the vehicle seat S of the present invention will be described with reference to FIGS. 1 to 8.

Figure 1:
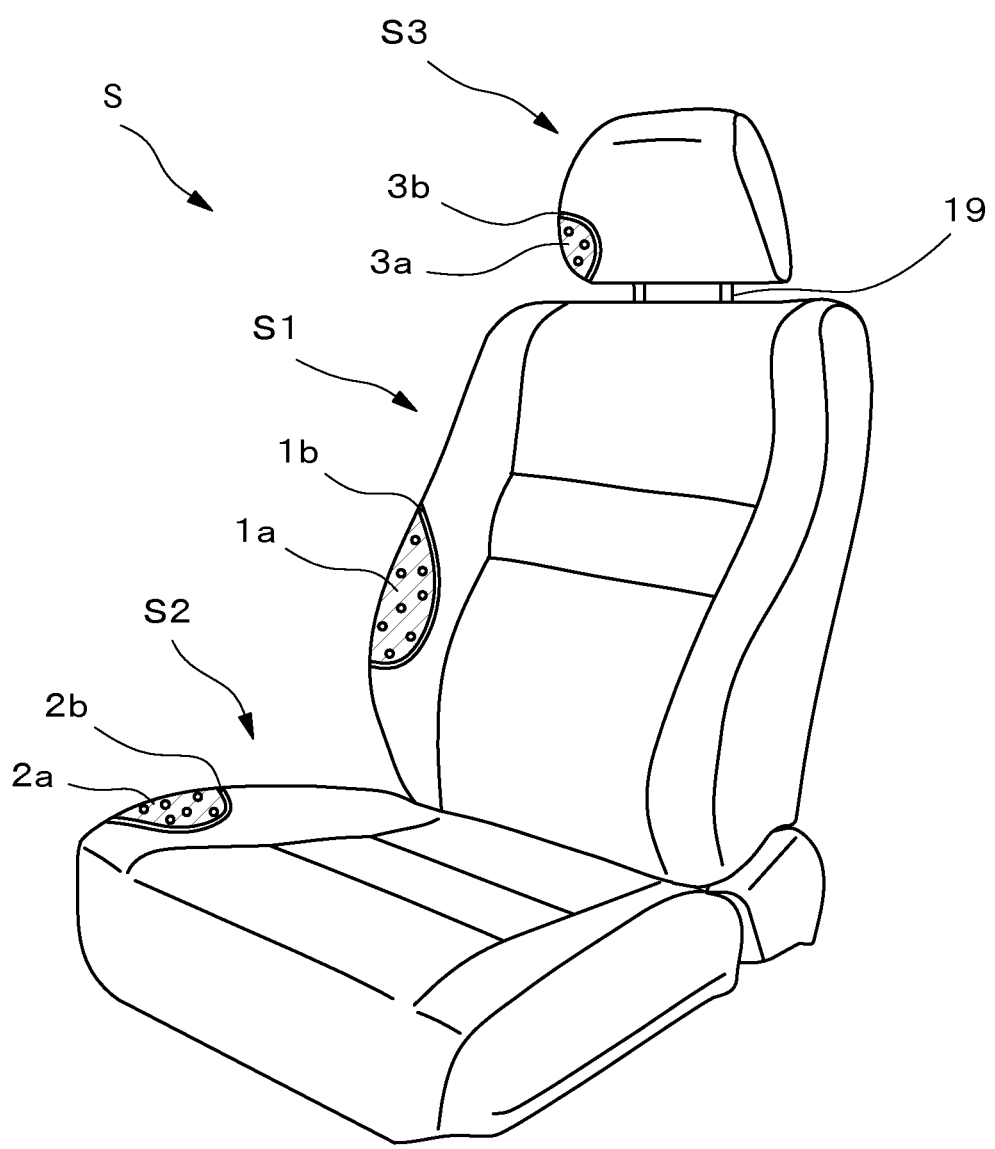
FIG. 1 is a schematic perspective view of a seat according to an embodiment of the present invention.

As illustrated in FIG. 1, the vehicle seat S according to the embodiment includes a seat back S1 (a back portion), a seat base S2, and a headrest S3, and the seat back S1 (the back portion) and the seat base S2 are formed in a manner such that cushion pads 1a and 2a are placed on a seat frame F and are covered by outer layer materials 1b and 2b. Furthermore, the headrest S3 is formed in a manner such that a pad material 3a is disposed in a core member (not illustrated) of a head and is covered by an outer layer material 3b. Further, a headrest pillar 19 which supports the headrest S3 is provided.

Figure 2:
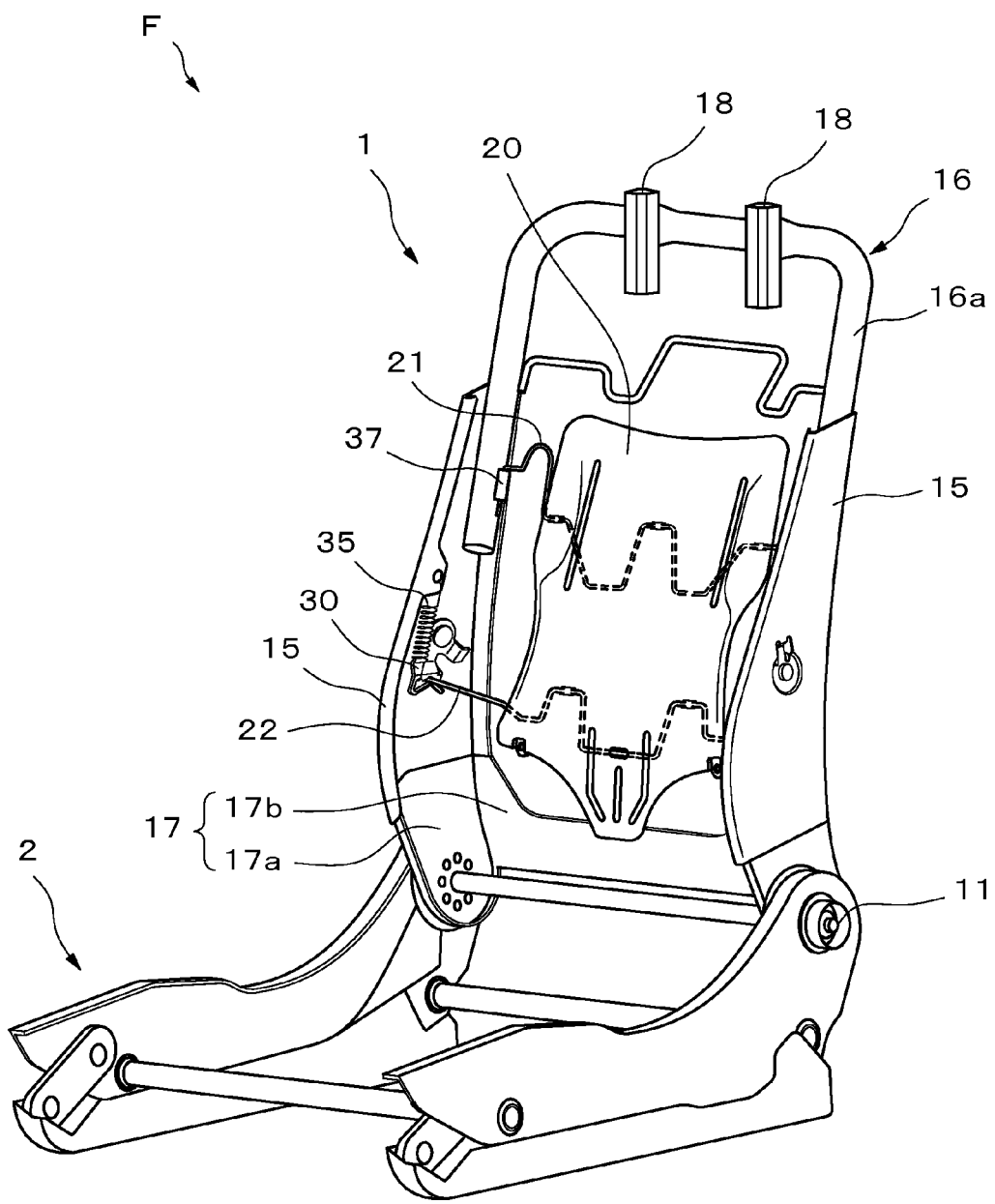
FIG. 2 is a schematic perspective view of a seat frame according to the embodiment of the present invention.

As illustrated in FIG. 2, the seat frame F of the vehicle seat S includes the seat back frame 1 which constitutes the seat back S1 and a seat base frame 2 which constitutes the seat base S2.

As described above, the seat base frame 2 supports the occupant from the lower portion in a state where the cushion pad 2a is placed on the seat base frame 2 and the seat base frame is covered by the outer layer material 2b from the upside of the cushion pad 2a. The seat base frame 2 is supported by leg portions, inner rails (not illustrated) are attached to the leg portions, and outer rails are provided in a floor of a vehicle body, thereby adjusting the position of the seat base frame in a sliding manner in the front and rear direction between the inner and outer rails.

Further, the rear end of the seat base frame 2 is jointed to the seat back frame 1 through a reclining mechanism 11.

As described above, the seat back S1 supports the occupant's back from the rear side in a state where the cushion pad 1a is placed on the seat back frame 1 and is covered by the outer layer material 1b from the upside of the cushion pad 1a. In this embodiment, as illustrated in FIG. 2, the seat back frame 1 is substantially formed by a rectangular frame body, and includes a side portion, an upper portion, and a lower portion.

The side portion includes two side frames 15 which are separated from each other in the lateral direction and extend in the vertical direction to form the width of the seat back. Then, an upper frame 16 which joints the upper end portions of the side frames 15 extends upward from the side portions to form the upper portion. Furthermore, the upper frame 16 extends upward from one side frame 15 and extends to the other side frame 15.

The lower portion of the seat back frame 1 is formed by jointing the lower ends of the side frames 15 to each other by a lower frame 17. The lower frame 17 includes elongated portions 17a which are jointed to the lower side portions of the side frames 15 and extend downward and an intermediate portion 17b which joints both elongated portions to each other. The elongated portion 17a extends in a range which does not cause any interference with the seat base frame 2.

Furthermore, the seat back frame 1 of this embodiment includes the side frame 15, the upper frame 16, and the lower frame 17 which are formed by separate members, but may be formed by an integrated pipe frame, an integrated plate frame, or the like. Further, a device such as a power motor may be attached to the lower portion.

As illustrated in FIG. 2, the upper frame 16 which is formed by a member that has a shape of a closed cross-section (for example, a circular or rectangular cross-section) is substantially bent in a U-shape. Then, a side surface portion 16a of the upper frame 16 is disposed to partially overlap a side plate 15a of the side frame 15 along the vertical direction, and is anchor-jointed to the side frame 15 at the overlapping portion (see FIG. 5). Furthermore, in this embodiment, the upper frame 16 is formed by a tubular member that has a circular cross-section, but may be also formed by a tubular member that has a rectangular cross-section.

Further, the headrest S3 is disposed above the upper frame 16 which constitutes the upper portion. As described above, the headrest S3 is formed in a manner such that the pad material 3a is provided in the outer periphery of the core member (not illustrated) and the outer periphery of the pad material 3a is covered by the outer layer material 3b. A pillar support portion 18 is disposed in the upper frame 16. The headrest S3 is attached in a manner such that the headrest pillar 19 (see FIG. 1) which supports the headrest S3 is attached to the pillar support portion 18 through a guide lock (not illustrated).

As illustrated in FIG. 2, the side frame 15 which serves as the side portion constituting a part of the seat back frame 1 is formed with a predetermined length in the vertical direction, and the side frames are disposed to face each other with a predetermined gap in the lateral direction.

Figure 5:
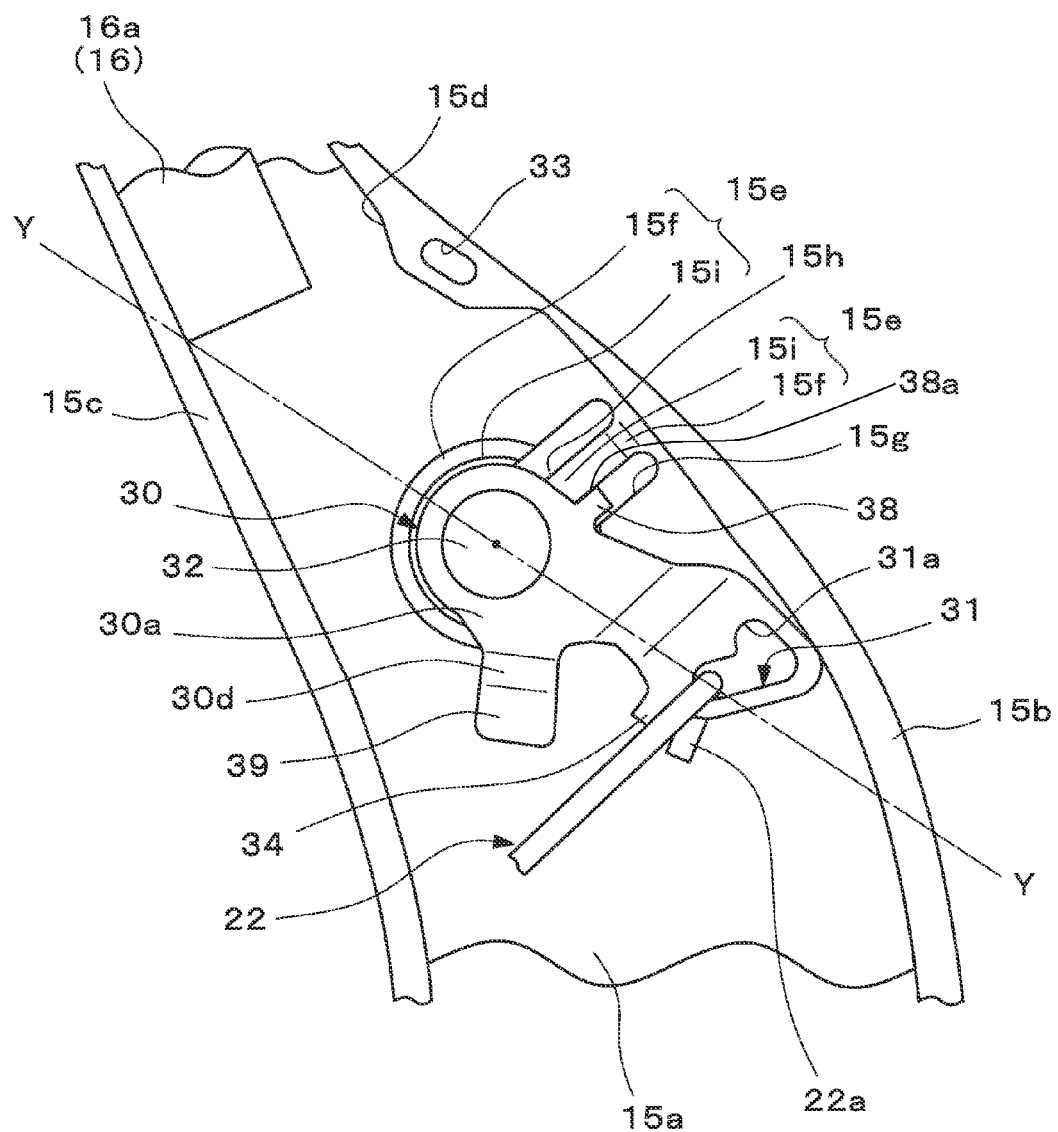
FIG. 5 is an enlarged side view illustrating a relation between a side frame and the impact reduction member according to the embodiment of the present invention.

The side frame 15 of this embodiment is an extension member that constitutes the side surface of the seat back frame 1, and includes a flat side plate 15a, a front edge 15b which is bent and is folded back inwardly in a U-shape from the front end (the end which is positioned at the front side of the vehicle) of the side plate 15a, and a rear edge 15c which is bent inwardly in an L-shape from the rear end (see FIG. 5).

The front edge 15b of this embodiment is provided with a protrusion portion 15d which protrudes toward the rear edge 15c, and the protrusion portion 15d is provided with a locking hole 33 which serves as a locking portion for locking a spring.

Further, a notch portion which is narrowed by notching toward the front side of the vehicle may be formed at a position from the protrusion portion 15d of the front edge 15b to the arrangement position of a tension coil spring 35 as the biasing element. By the notch portion, the side frame 15 may prevent the interference with the tension coil spring 35.

Then, a movement member 30, to be described later, is locked to the side frame 15 of this embodiment. Furthermore, the configuration and the operation of the movement member 30 will be described later.

A pressure receiving member 20 which serves as a posture maintaining member supporting the cushion pad 1a from the rear side is disposed in the inner region of the seat back frame 1 in the seat back frame 1 (between both side frames 15).

The pressure receiving member 20 of this embodiment is a member that is formed by a resin into a substantially rectangular plate shape, and the surface which contacts the cushion pad 1a has a smooth concavo-convex portion. As illustrated in FIG. 2, the upper portion side and the lower portion side of the rear side of the pressure receiving member 20 are provided with claws which lock the wires 21 and 22.

The pressure receiving member 20 of this embodiment is supported by a joint member. Specifically, two wires 21 and 22 as the joint members are provided between both side frames 15, and engage with the pressure receiving member 20 by the claws which are formed at the predetermined positions of the upper portion side and the lower portion side of the rear side of the pressure receiving member 20, thereby supporting the pressure receiving member 20 at the rear surface of the cushion pad 1a. The wires 21 and 22 are formed by steel wires having a spring property and are provided with a winding portion as a bent portion.

Particularly in two wires 21 and 22 locked to the pressure receiving member 20 of this embodiment, the lower wire 22 is provided with the winding portion and is largely deformed by a predetermined load or more (a load larger than a movement or pivoting load of the impact reduction member to be described later), whereby the pressure receiving member 20 moves rearward with the larger movement amount.

Figure 3:
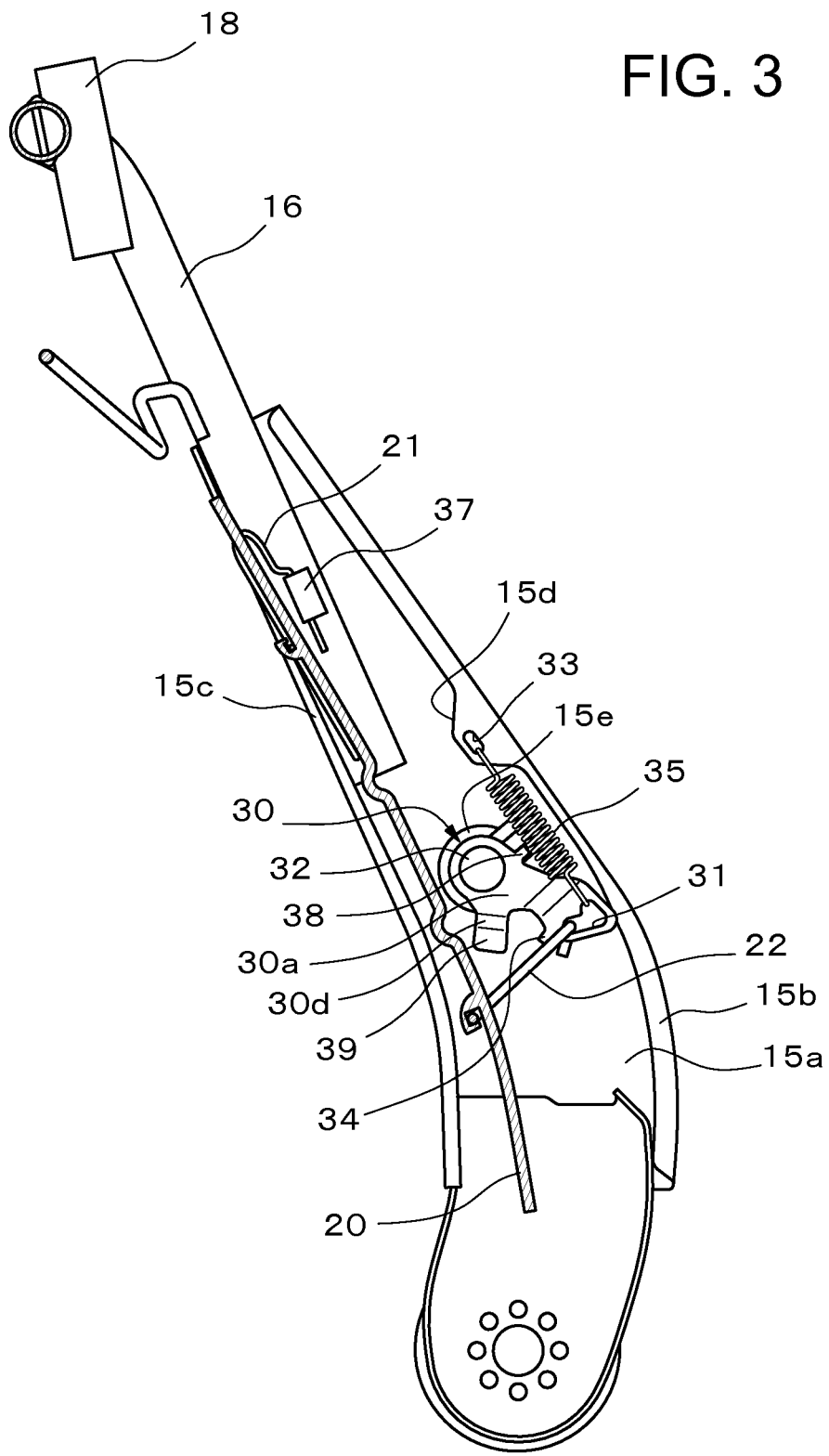
FIG. 3 is a schematic cross-sectional side view illustrating a seat back frame before an impact reduction member according to the embodiment of the present invention pivots.
Figure 4:
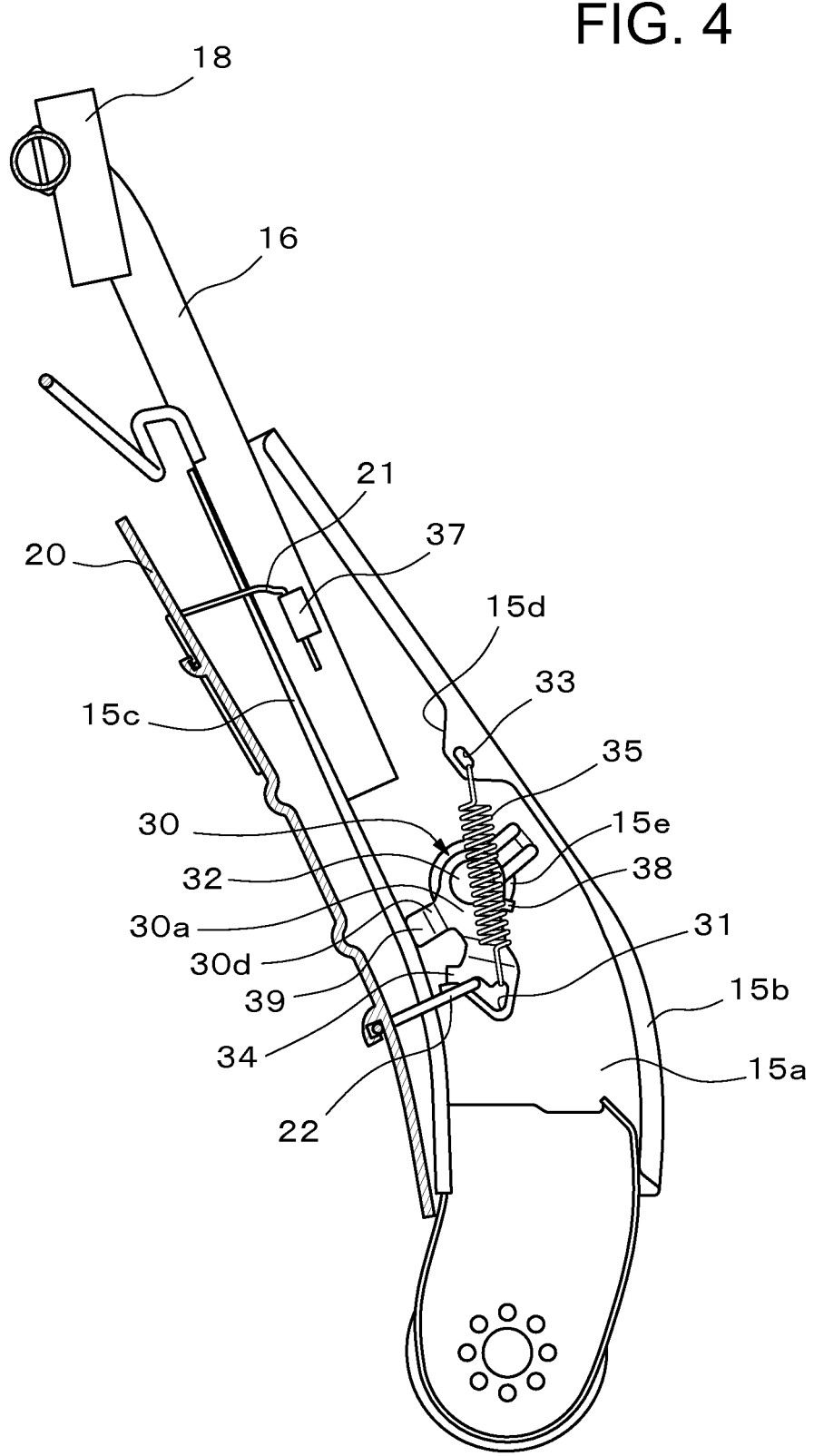
FIG. 4 is a schematic cross-sectional side view illustrating the seat back frame after the impact reduction member according to the embodiment of the present invention pivots.

As illustrated in FIGS. 3 and 4, in two wires 21 and 22 locked to the pressure receiving member 20 of this embodiment, both ends of the wire 21 locked to the upper portion side are hooked to attachment hooks 37 which are provided in both side frames 15. Both ends of the wire 22 locked to the lower portion side are hooked to locking portions 31 of the movement members 30 attached to the right and left side frames 15.

A Configuration of the Movement Member 30

The movement member 30, as the impact reduction member, moves toward the rear side of the vehicle by the impact load which is transmitted through the joint member (the wire 22) when a predetermined amount of impact load or more is applied to the pressure receiving member 20 due to rear end collision or the like, and also moves the pressure receiving member 20 rearward so that the occupant moves rearward. Furthermore, the "movement" indicates a movement such as a horizontal movement and a pivoting. In this embodiment, the movement member 30 that pivots around a shaft 32 by a pivoting shaft will be described. The pressure receiving member 20 may be largely moved toward the rear side of the vehicle by the movement of the movement member 30 toward the rear side of the vehicle so that the occupant is moved rearward. Accordingly, it is possible to reduce an impact which is applied to the occupant.

Figure 6:
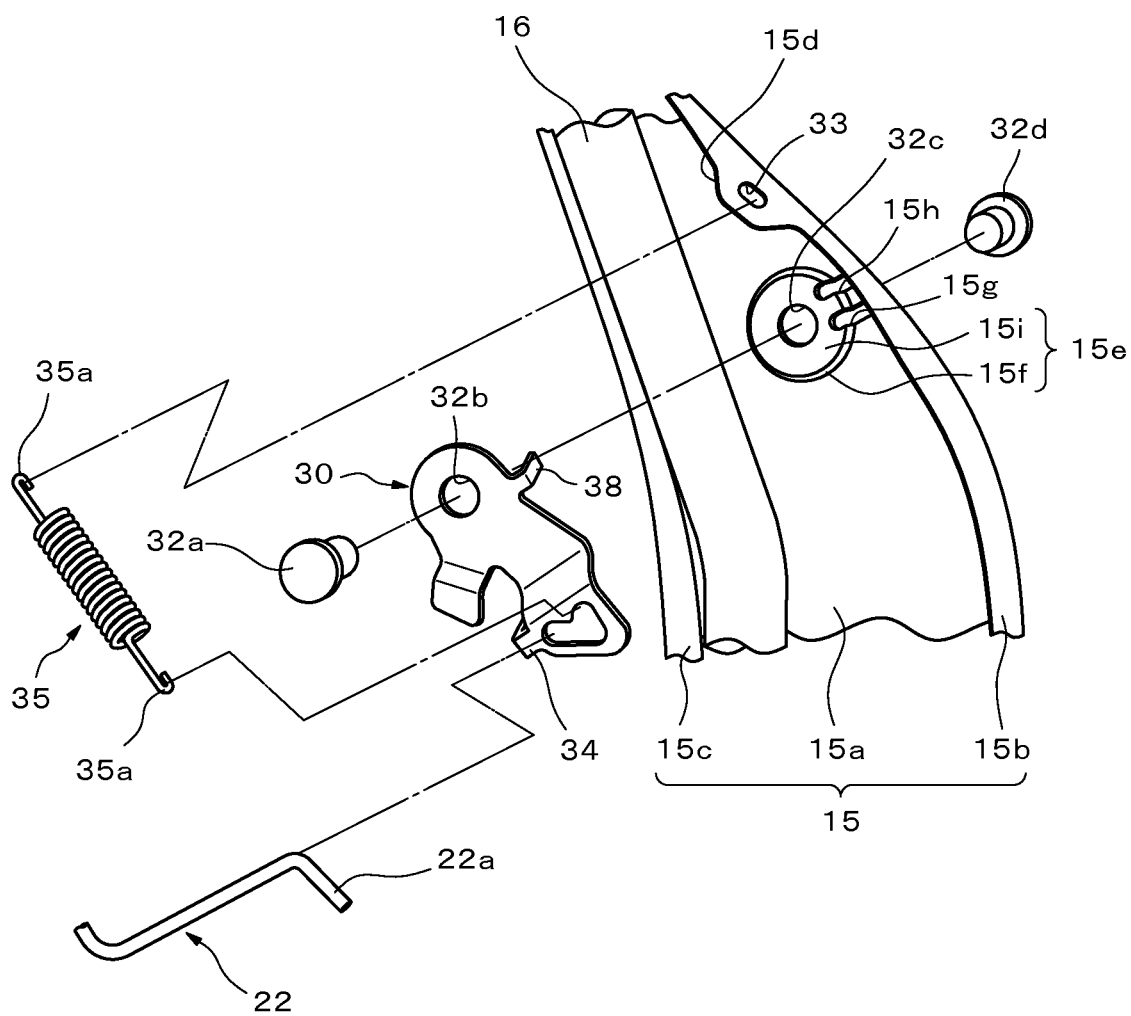
FIG. 6 is an exploded view of a biasing element and the impact reduction member according to the embodiment of the present invention.

As illustrated in FIGS. 5 and 6, the movement member 30 of this embodiment is axially supported to be rotatable through the shaft 32 as the pivoting shaft inside the side plates 15a of both side frames 15, whereby the movement member is locked to the lower wire 22 as the joint member and is jointed to the spring (the tension coil spring 35) as the biasing element for biasing the wire 22. Specifically, the movement member 30 is jointed to the biasing element 35, and biases the pressure receiving member 20 toward the front side of the seat back frame 1 through the joint member 22 (furthermore, the tension coil spring 35 is not illustrated for the description in FIG. 5).

Then, the movement member 30 of this embodiment is disposed inside the side frame 15 by the rotatable shaft 32.

As illustrated in FIG. 6, the shaft 32 includes a shaft member 32a, a shaft hole 32b which is provided in the movement member 30, a hole portion 32c which is provided in the side plate 15a of the side frame 15, and a fitting member 32d, where the shaft member 32a is inserted through the shaft hole 32b to be fitted to the hole portion 32c and the fitting member 32d is fitted from the front end of the shaft member 32a to axially support the movement member 30 in a rotatable manner. Furthermore, in the side plate 15a of the side frame 15, a convex portion 15e is formed in an inward bulged state at a position where the shaft 32 is disposed, and more specifically, a range where the shaft 32 moves (pivots).

The movement member 30 of this embodiment includes the rotatable shaft 32, a locking portion 31 of a joint member formed at a position separated from the shaft 32 by a predetermined distance, a locking portion (a locking concave portion 31a) of the biasing element, and a movement preventing portion 39 which prevents the movement (pivoting).

A hook end (a hook portion 22a) which is formed by bending the wire 22 as the joint member is inserted through the locking portion 31 which locks the joint member (the wire 22) of this embodiment in a hooking manner. Then, the locking portion 31 is formed by an elongated hole to easily perform the attachment of the hook portion 22a. Further, in the locking portion 31, the locking concave portion 31a which is used to lock the biasing element (the tension coil spring 35), to be described later, is integrally and continuously formed.

A formation portion 30c of the locking portion 31 is formed to extend in the outer peripheral direction from a first raised portion 30b which is raised formed while being continuous to the outer periphery of a base portion 30a constituting the movement member 30. The first raised portion 30b is formed at a position substantially separated by 90° from the position of the movement preventing portion 39 about the shaft 32.

In the wire 22 which is hooked to the locking portion 31, the end which is inserted through the locking portion 31 is bent to form the hook portion 22a. By forming the hook portion 22a, the wire may not easily be separated from the movement member 30 even when a large load is applied to the wire 22 during the movement (pivoting) of the movement member 30.

Then, in order to further prevent the wire 22 from being easily separated from the movement member 30, the formation portion 30c provided with the locking portion 31 of the movement member 30 is provided with a hook-shaped pivoting suppressing portion 34 which is formed in a protruding manner at the rear side of the vehicle relative to the locking portion 31.

The pivoting suppressing portion 34 is a protrusion which is integrally formed to extend from the formation portion 30c, and the protrusion is bent toward the installation side of the end (the hook portion 22a) of the wire 22. Accordingly, when the movement member 30 moves (pivots) upon rear end collision or the like, a load is applied to the wire 22 toward the rear side of the vehicle, and then the wire 22 pivots; the pivoting suppressing portion 34 abuts against the hook portion 22a.

In this way, since the pivoting suppressing portion 34 is formed at a position where the pivoting suppressing portion easily abuts against the end of the wire 22 which is inserted toward the side frame 15 from the inside of the seat, the separation of the wire 22 is suppressed.

Figure 7:
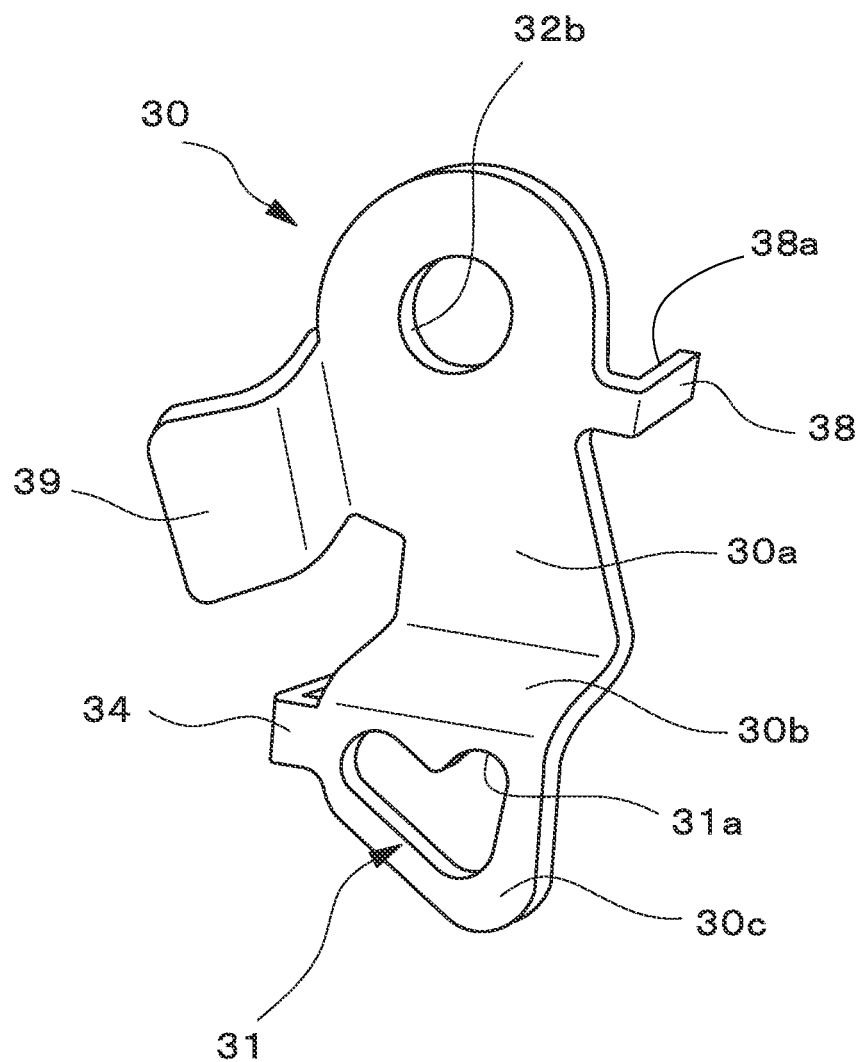
FIG. 7 is a perspective view diagram illustrating the impact reduction member according to the embodiment of the present invention.
Figure 8:
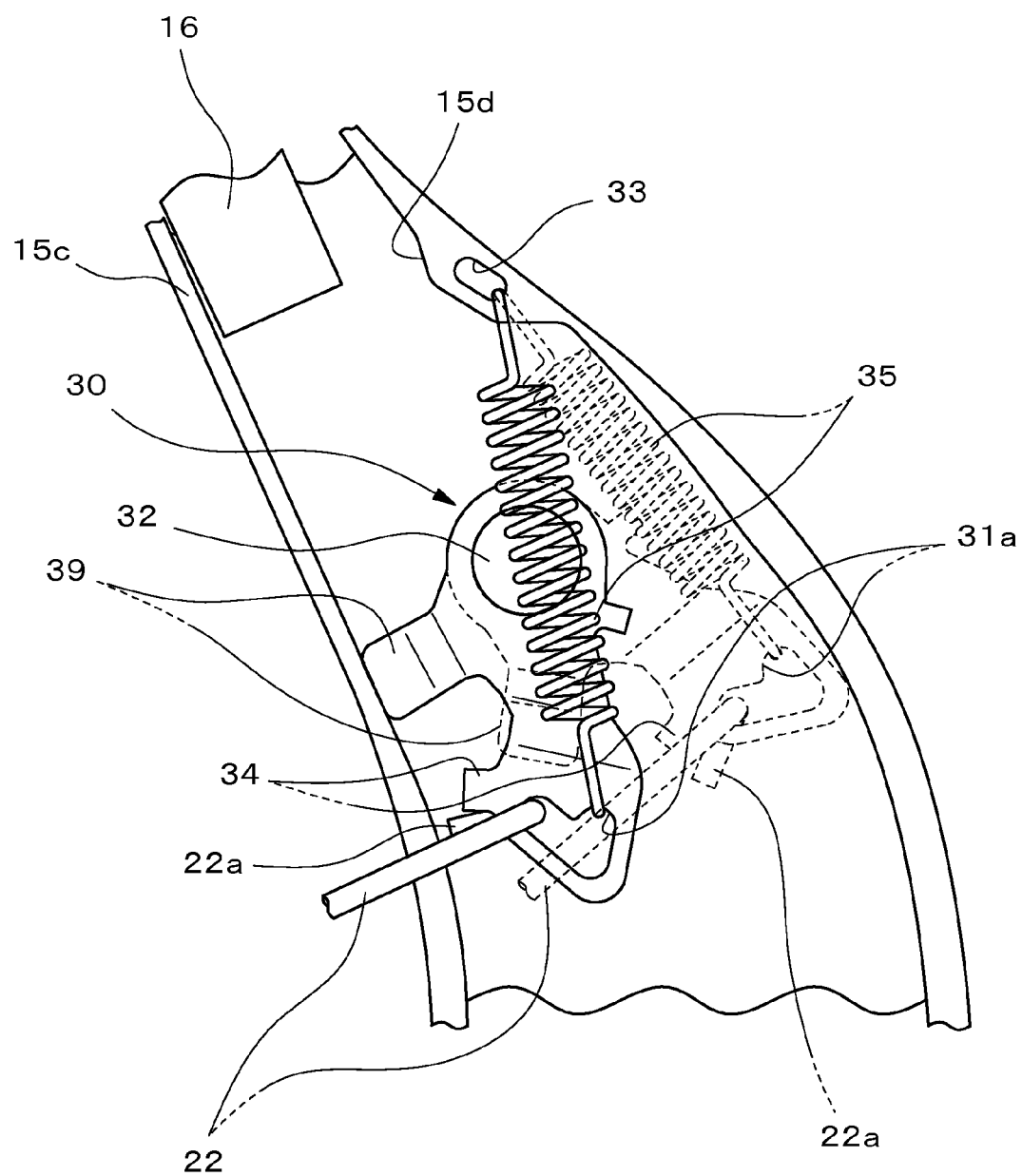
FIG. 8 is a side view diagram illustrating a state of the biasing element and the impact reduction member according to the embodiment of the present invention before and after rear end collision occurs.

As illustrated in FIG. 7, the pivoting suppressing portion 34 is formed by a hook-shaped protrusion which extends from the formation portion 30c, and the protrusion is formed to be substantially perpendicular to the side frame 15. Then, as illustrated in FIG. 8, the pivoting suppressing portion engages with the hook portion 22a of the wire 22 to suppress the pivoting of the wire 22 during the movement (pivoting) of the movement member 30.

Specifically, the pivoting suppressing portion 34 is formed relative to the hook portion 22a so that the pivoting suppressing portion is formed at the pivoting side of the hook portion 22a during the movement (pivoting) of the movement member 30.

When a rearward load is applied to the wire 22 in the event of rear end collision, the movement member 30 moves (pivots) rearward. At this time, a rearward tension is applied to the wire 22, and the wire 22 pivots, so that the hook end 22a may be separated from the locking portion 31 which is formed in an elongated hole shape. However, since the pivoting suppressing portion 34 is formed at the pivoting side of the hook portion 22a of the wire 22 during the movement (pivoting) of the movement member 30 so that the hook portion 22a engages with the pivoting suppressing portion 34, the pivoting of the wire 22 may be suppressed, and hence the separation of the wire 22 from the locking portion 31 of the movement member 30 may be suppressed.

The locking concave portion 31a of the biasing element of this embodiment is used to lock the end of the tension coil spring 35 as the biasing element, and is formed to notch a part of the locking portion 31 rearward in the formation portion 30c provided with the locking portion 31. Then, as illustrated in FIG. 5, the locking concave portion 31a is formed at the front side of the vehicle relative to the line Y jointing the center of the shaft 32 and the position where the locking portion 31 hooks the wire 22. Furthermore, for the description in FIG. 5, the tension coil spring 35 is not illustrated.

As illustrated in FIG. 6, the tension coil spring 35 as the biasing element of this embodiment is formed by coiling a spring wire, and both ends thereof are respectively provided with a semi-circular hook 35a. Then, the hooks 35a of the tension coil spring 35 are locked to the locking concave portion 31a of the movement member 30 and the locking hole 33 of the protrusion portion 15d of the side frame 15. With such a configuration, the movement member 30 is biased toward the front side of the seat back frame 1 by the tension coil spring 35 (see FIG. 8).

The aforementioned movement members 30 are attached to both side frames 15, and the hook portions 22a as both ends of the wire 22 are hooked to the respective locking portions 31 of both movement members 30, so that the respective movement members 30 are independently operated from each other.

In this embodiment, the movement members 30 are attached to both side frames 15, but the movement members 30 which are attached to both sides independently move (pivot). For this reason, when a biased load is generated, the movement members 30 of both side portions are respectively independently moved (pivot) to match the loads, and hence the occupant's body may sink in accordance with the magnitude of the impact load.

In a normal seating state where the occupant sits on the seat, a tension is generated which moves (pivots) the movement member 30 rearward through the cushion pad 1a, the pressure receiving member 20, and the wire 22 inside the seat back S1, whereas the tension coil spring 35 biases the movement member 30 so that the movement member is moved (pivoted) toward the front side of the seat back frame 1. Here, since the tension coil spring 35 which is jointed to the movement member 30 has a load characteristic in which the spring is not bent by a load in a load region of a normal seating state, the movement member 30 is normally restrained at the initial position. Specifically, a force of returning the movement member 30 to the initial state against a force of moving (rotating) the movement member 30 becomes largest in a normal seating state.

Then, the movement member 30 is integrally formed with a protruded piece 38 which controls the range of the movement (pivoting) caused by the biasing force of the tension coil spring 35. The movement member 30 includes the base portion 30a which makes a slide contact with the side plate 15a and the protruded piece 38 which protrudes from the base portion 30a and is bent toward the side plate 15a to engage with the convex portion 15e. Specifically, as illustrated in FIG. 5, the protruded piece 38 is continuous to the outer periphery of the base portion 30a which makes a slide contact with the convex portion 15e formed on the side plate 15a and partially protrudes from the base portion 30a. In the protruded piece 38, a surface perpendicular to the base portion 30a is bent toward the outside of the seat, that is, toward the side plate 15a of the side frame 15. Then, the protruded piece 38 with the aforementioned configuration is formed at the front side of the vehicle relative to the installation position of the shaft 32 in the movement member 30.

The protruded piece 38 engages with the convex portion 15e of the side frame 15 while abutting against the convex portion from the downside. Accordingly, it is possible to press and stop the upward force applied to the movement member 30 by the biasing force of the tension coil spring 35.

A slope portion 15f is an inclined surface which is in a raised manner formed toward the inside of the seat from the side plate 15a of the side frame 15, and constitutes the convex portion 15e together with a planar portion 15i.

Then, the slope portion 15f is formed to be continuous from the portion sliding on the movement member 30 to the front edge 15b of the side frame 15. Furthermore, in this embodiment, the slope portion 15f extends to the front edge 15b, but may extend to the rear edge 15c. Specifically, in the side frame 15, the slope portion 15f is substantially formed in a circular shape in the top view at a position surrounding the base portion 30a disposed around the shaft 32 and the shaft 32, and a part thereof further extends toward the front edge 15b or the rear edge 15c.

Then, the slope portion 15f is formed in a portion having high rigidity such as the front edge 15b or the rear edge 15c, and the protruded piece 38 has a contact portion 38a that abuts against the convex portion 15e which extends toward the front edge 15b or the rear edge 15c. Accordingly, since the protruded piece 38 abuts against the convex portion 15e having high rigidity, the deformation of the convex portion may be prevented even when a large load is applied thereto due to the rear end collision.

Then, a stopper portion 15g is formed by notching a part of the convex portion 15e (more specifically, a part of the slope portion 15f) in an elongated hole shape. Since the stopper portion 15g is formed, the end of the protruded piece 38 is easily caught by the stopper portion 15g. As a result, it is possible to prevent the protruded piece 38 from getting on the convex portion 15e even when the upward force is applied to the protruded piece 38 by the tension coil spring 35. Furthermore, the protruded piece 38 which is formed in a hook shape is not fitted to the stopper portion 15g, and the opening end thereof is formed to be in the same plane as the side plate 15a. Accordingly, when the movement member 30 moves (pivots) rearward, the movement (pivoting) of the movement member 30 is not disturbed without the fitting of the protruded piece 38 to the stopper portion 15g.

In addition, a hole 15h which is notched in an elongated hole shape is formed at a position facing the stopper portion 15g while being separated therefrom by a predetermined distance. The hole 15h is substantially formed with the same shape and size as those of the stopper portion 15g, and the long axis of the elongated hole is parallel to the long axial direction of the stopper portion 15g.

By forming the hole 15h, the movement member 30 to be attached to the convex portion 15e (more specifically, the slope portion 15f and the planar portion 15i) may easily be formed. Further, the vehicle seat S may be further decreased in weight by further notching a part of the side frame 15.

Further, the planar portion 15i which constitutes the convex portion 15e is formed to be substantially perpendicular to the movement range (the pivoting shaft) of the movement member 30. Accordingly, the convex portion 15e abuts against the plane base portion 30a at a wide area. As a result, since a large friction is generated when the planar portion 15i slides on the base portion 30a, the stopper portion function is improved during the movement (pivoting) of the movement member 30, and hence the movement (pivoting) range of the movement member 30 may easily be controlled. Further, since the planar portion 15i slides on the base portion 30a, the movement member 30 may stably move (pivot) relative to the side frame 15.

The movement preventing portion 39 of this embodiment is used to prevent the movement (pivoting) when the movement member 30 moves (pivots). As illustrated in FIGS. 3 and 4, a second raised portion 30d is formed to partially protrudes from the base portion 30a while being continuous to the outer periphery of the base portion 30a sliding on the convex portion 15e formed in the side plate 15a when rotating about the shaft 32, and a surface perpendicular to the second raised portion 30d extends toward the outside of the pivoting shaft (the shaft 32), thereby forming the movement preventing portion 39. Then, the movement preventing portion 39 with the aforementioned configuration is formed at the rear side of the vehicle relative to the installation position of the shaft 32 in the movement member 30.

The second raised portion 30d is in a raised manner formed in a direction separated from the side plate 15a, that is, a direction substantially perpendicular to the base portion 30a, and the movement preventing portion 39 which is formed by the surface substantially perpendicular to the second raised portion 30d is formed to be substantially parallel to the side plate 15a of the side frame 15. Since the movement preventing portion 39 abuts against the rear edge 15c of the side frame 15, the movement (pivoting) range of the movement member 30 is regulated.

Specifically, as illustrated in FIG. 5, the second raised portion 30d forms a bent portion which is parallel to the rear edge 15c of the side frame 15 and is in a raised manner formed while being bent in a direction separated from the side plate 15a (toward the inside in the lateral direction of the seat back frame 1), and the movement preventing portion 39 is further continued from the bent portion and is bent in a direction perpendicular to the rear edge 15c.

Each movement preventing portion 39 is an abutting portion which abuts against the rear edge 15c of the side frame 15 to prevent the movement (pivoting) of the movement member after the movement member 30 moves (pivots). Then, the surface of the movement preventing portion 39, which abuts against the side frame 15 after the movement member 30 moves (pivots), in the thickness direction is formed to be flush with the rear edge 15c in the abutting state.

The movement preventing portion 39 is provided to regulate the set movement (pivoting) range of the movement member 30, and the range is set such that the movement preventing portion 39 abuts against the upper frame 16 to stop the movement (pivoting) of the movement member when the movement member 30 moves (pivots) by the load of the occupant in the event of the rear end collision. Specifically, the movement preventing portion 39 is provided, which sets the stop position after the movement member 30 moves (pivots).

In this way, the movement preventing portion 39 of the movement member 30 is integrally formed by extending the movement member 30 in the outer peripheral direction, and the abutting surface abuts against the side frame 15 after the movement (pivoting). Accordingly, the number of components may be decreased, and the movement (pivoting) of the movement member 30 may stably and reliably be stopped by the configuration ensuring the strength.

The movement preventing portion 39 is formed at a position where the movement preventing portion does not interfere with the joint member (the wire 22) or the biasing element (the tension coil spring 35) to be described later.

Furthermore, in this embodiment, the movement preventing portion 39 of the movement member 30 directly abuts against the side frame 15 to prevent the movement (pivoting) of the movement member, but a sound absorbing member such as a rubber element having a thickness that does not disturb the stable stopping of the movement (pivoting) of the movement member 30 may be attached between the movement preventing portion 39 and the side frame 15 to prevent abnormal noise generated by the abutting operation. With such a configuration, the movement (pivoting) may stably be prevented and a sound absorbing effect may be expected.

Operations of the Movement Member 30

As described above, since the movement member 30 includes the protruded piece 38 and the movement preventing portion 39, the movement (pivoting) range is controlled. Hereinafter, the movement of the movement member 30 in the event of the rear end collision will be described with reference to the drawings.

FIG. 3 illustrates a state before the impact reduction member pivots, FIG. 4 illustrates a state after the impact reduction member pivots, and FIG. 5 illustrates a relation between the impact reduction member and the side frame before the pivoting, where the dashed line of FIG. 8 illustrates a state before the rear end collision occurs and the solid line illustrates a state after the rear end collision occurs.

In a normal state, the protruded piece 38 abuts against the convex portion 15e at the formation position of the stopper portion 15g provided in the side frame 15, and presses and stops the upward force generated by the tension coil spring 35 to restrict the movement (pivoting) range so that the movement member 30 does not move (pivot) forward.

Then, as illustrated in FIG. 8, when the occupant moves rearward due to the inertia force while receiving an impact from the rear side in the event of the rear end collision, a tension is generated in a direction in which the load moves (pivots) the movement member 30 rearward (leftward in FIG. 8) through the pressure receiving member 20 (not illustrated in FIG. 8) and the wire 22 locked to the pressure receiving member 20. The tension generated at this time becomes a sufficient load for extending the tension coil spring 35 holding the movement member 30 at the initial position and moving (rotating) the movement member 30 rearward.

A threshold value of a force of starting the movement (pivoting) of the movement member 30 is set to a value larger than the normal sitting load.

Here, it is preferable that the threshold value of the force of starting the movement (pivoting) of the movement member 30 be larger than 150 N since the load which is applied to the seat back S1 in the normal seating state (here, the sitting impact or the small impact generated when suddenly starting the vehicle is excluded) is about 150 N. When the value is smaller than this value, the movement member moves even in the normal seating state, and hence this is not preferable due to the insufficient stability.

Further, it is preferable that the value be set to be larger than 250 N in consideration of the sitting impact generated in the normal seating state or the acceleration load generated when suddenly starting the vehicle. With such a configuration, the movement member 30 may be maintained in a stable state since the movement member is not operated in the case other than the rear end collision.

As described above, when the movement member 30 moves (pivots) rearward, the wire 22 which is hooked to the locking portion 31 moves rearward. Thus, the pressure receiving member 20, which is locked to the wire 22, and the cushion pad 1a, which is supported by the pressure receiving member 20, move rearward so that the occupant may sink in the seat back S1.

Hereinafter, the movement (pivoting) characteristic of the movement member 30 in the event of the rear end collision will be described in more detail with reference to FIG. 8.

At the initial position before the movement (pivoting) of the movement member 30, the locking portion 31 which locks the wire 22 and the locking concave portion 31a which locks the lower end of the tension coil spring 35 are arranged to be positioned at the front side of the vehicle relative to the shaft 32, and the upper end of the tension coil spring 35 is locked to the locking hole 33 which is formed in the protrusion portion 15d of the side frame 15 positioned above the movement member 30.

When a predetermined tension or more is generated in the wire 22 by the rear end collision and the movement member 30 starts to move (pivot) against the tension coil spring 35, the tension coil spring 35 extends, and the locking concave portion 31a which is provided in the movement member 30 moves rearward while rotating about the pivoting center of the shaft 32. Then, as illustrated in FIG. 8, the movement member 30 moves (pivots) until the movement preventing portion 39 abuts against the side frame 15 to prevent the movement (pivoting) of the movement member 30. Accordingly, the pressure receiving member 20 largely moves toward the rear side of the seat back frame 1 from the state indicated by FIG. 3 to the state indicated by FIG. 4, and hence the sinking amount increases.

In this embodiment, when the movement member 30 moves (pivots) so that the pressure receiving member 20 moves, the movement direction of the locking concave portion 31a does not match the extension direction of the tension coil spring 35 since the upper end of the tension coil spring 35 is fixed to the locking hole 33 which is formed above the movement member 30.

Specifically, the movement (pivoting) amount of the movement member 30 is not proportional to the tension load (the bent amount) of the tension coil spring 35. In other words, the pivoting angle of the movement member 30 is not simply proportional to the forward pivoting torque (the pivoting force) applied by the tension coil spring 35.

Specifically, the locking concave portion 31a which locks the lower end of the tension coil spring 35 depicts a circular-arc locus about the pivoting center of the shaft 32, whereas the locking hole 33 which locks the upper end of the tension coil spring 35 is formed by a fixed end that is anchor-jointed to the upside of the movement member 30.

Since the movement member 30 has the aforementioned movement (pivoting) characteristic relative to the tension generated through the wire 22, the occupant may be reliably and efficiently sunk in the cushion pad 1a of the seat back S1 when the rear end collision occurs.

At this time, since the occupant's back portion moves rearward while being sunk in the seat back S1, the position of the headrest S3 is not relatively changed. For this reason, the gap between the headrest S3 and the head portion decreases, and hence the head may be supported by the headrest S3. Accordingly, there is an effect that the impact applied to the neck may be effectively reduced.

In the aforementioned embodiment, an example is illustrated in which the movement members 30 are provided in both right and left side frames 15, but the movement member may be provided only in one side frame 15. In this case, the joint members (the wires) 21 and 22 may be directly locked to the side frame 15 without the movement member 30.

Second Embodiment

Hereinafter, a seat frame F' according to a second embodiment of the present invention will be described with reference to FIGS. 9 to 16. Furthermore, the same configurations as those of the aforementioned embodiment will be denoted by the same reference numerals, and the description thereof will not be repeated.

This embodiment is different from the aforementioned embodiment in that a movement member 130, a side frame 115, and a main pipe 116 have different configurations and a load input member 40 is provided.

In the seat back frame 1' of this embodiment, the side portion includes two side frames 115 which are separated from each other in the lateral direction and extend in the vertical direction to form the width of the seat back. The side frame 115 includes a side plate 115a, a front edge 115b, a rear edge 115c, and a protrusion portion 115d which have the same configurations as those of the side plate 15a, the front edge 15b, the rear edge 15c, and the protrusion portion 15d of the aforementioned embodiment. Furthermore, a convex portion 115e of this embodiment does not include the stopper portion 15g and the hole 15h as different from the convex portion 15e of the aforementioned embodiment.

The main pipe 116 which serves as the frame member jointing the upper ends of the side frames 115 extends upward from the side portion to form the upper portion. Furthermore, the main pipe 116 not only forms the upper portion, but also forms the lower portion in a manner such that the side surface portion 116a extends upward from one side frame 115, extends to the other side frame 115, and further extends downward. In this embodiment, an example is illustrated in which the main pipe 116 is formed in an annular shape extending through the upper portion, the side portion, and the lower portion to form a frame body. However, the main pipe may be formed in the other shape as long as the main pipe has a configuration in which the main pipe has a rigidity capable of withstanding the load generated by the side collision, joints at least the upper portions of the side frames 115, and extends to the lower portions of the side frames 115.

The movement preventing portion 39 provided in the movement member 130, to be described later, is locked by the main pipe 116 having the aforementioned configuration so that the movement (pivoting) range of the movement member 130 may be restricted and the strength to the load generated by the side collision is improved. As a result, the vehicle seat S of this embodiment of the present invention may sink the occupant's body in the event of the rear end collision and may easily attach the peripheral member of the side frame 115. Accordingly, it is possible to further efficiently transmit the load generated by the side collision to the vehicle body. Furthermore, the configuration of the movement member 130 will be described in detail below.

Figure 15:
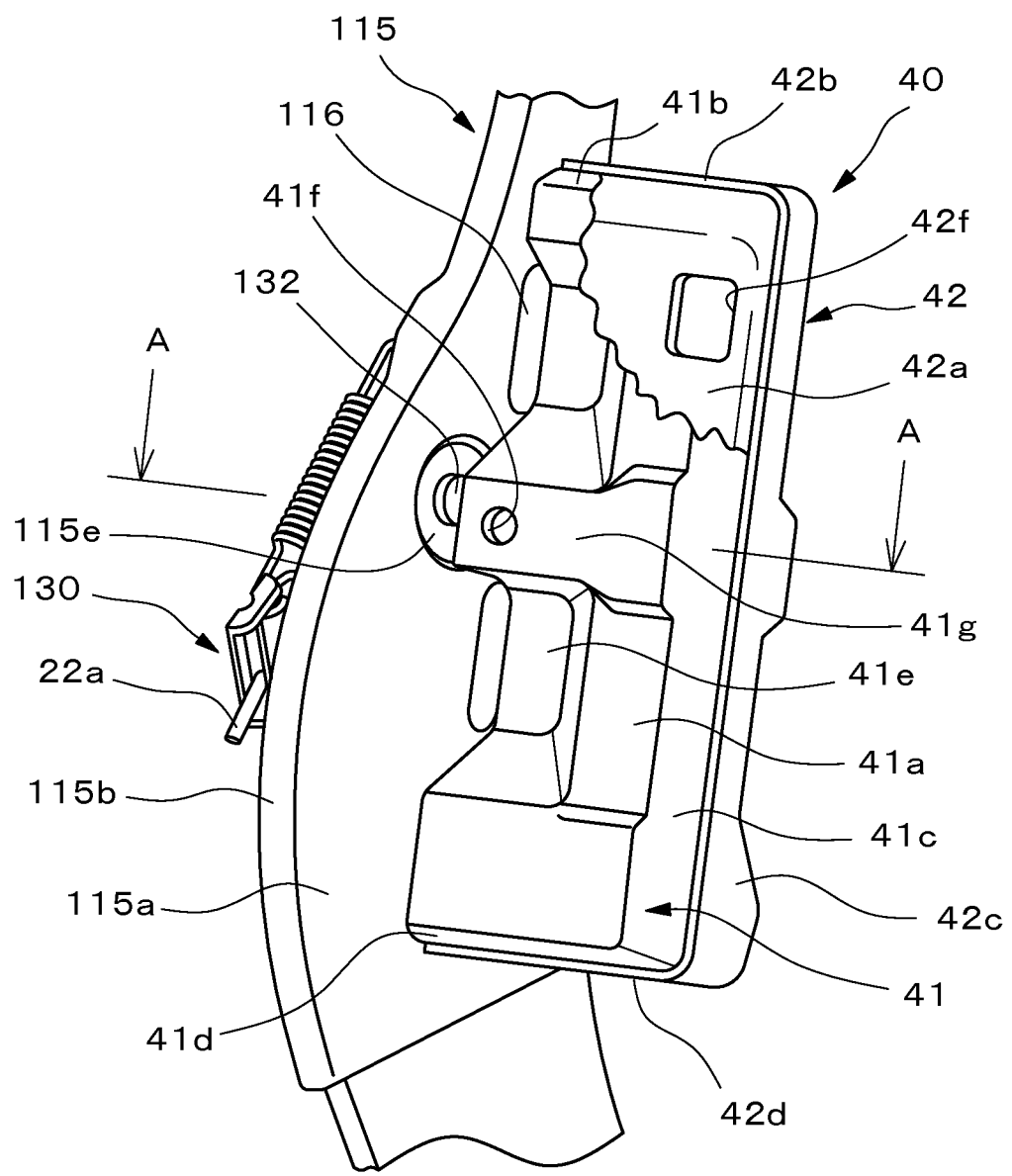
FIG. 15 is an enlarged perspective view illustrating a relation between a side frame and a load input member according to another embodiment of the present invention.
Figure 16:
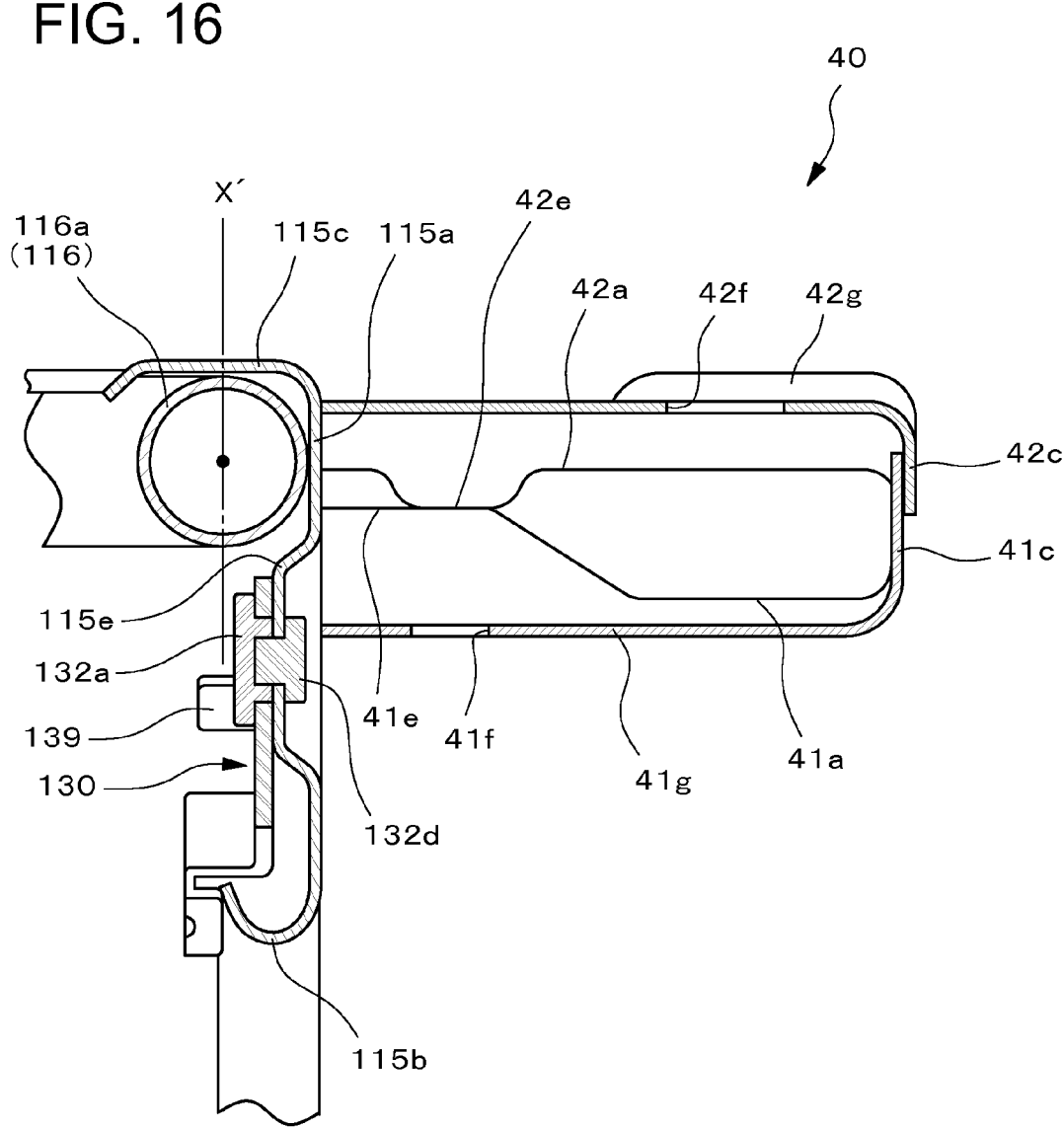
FIG. 16 is a schematic cross-sectional view corresponding to the line A-A in FIG. 15.

Further, the inside of the rear edge 115c provided in the side frame 115 of this embodiment is disposed to abut against the surface of the main pipe 116 which is formed in a pipe shape (see FIG. 16). Furthermore, a part of the side plate 115a is bent and is provided with an opening, and the main pipe is disposed so that a part of the surface of the main pipe 116 protrudes from the opening (see FIG. 15).

Then, the movement member 130, to be described later, is locked to the inside of the side frame 115 of this embodiment by a rotatable shaft 132.

Figure 13:
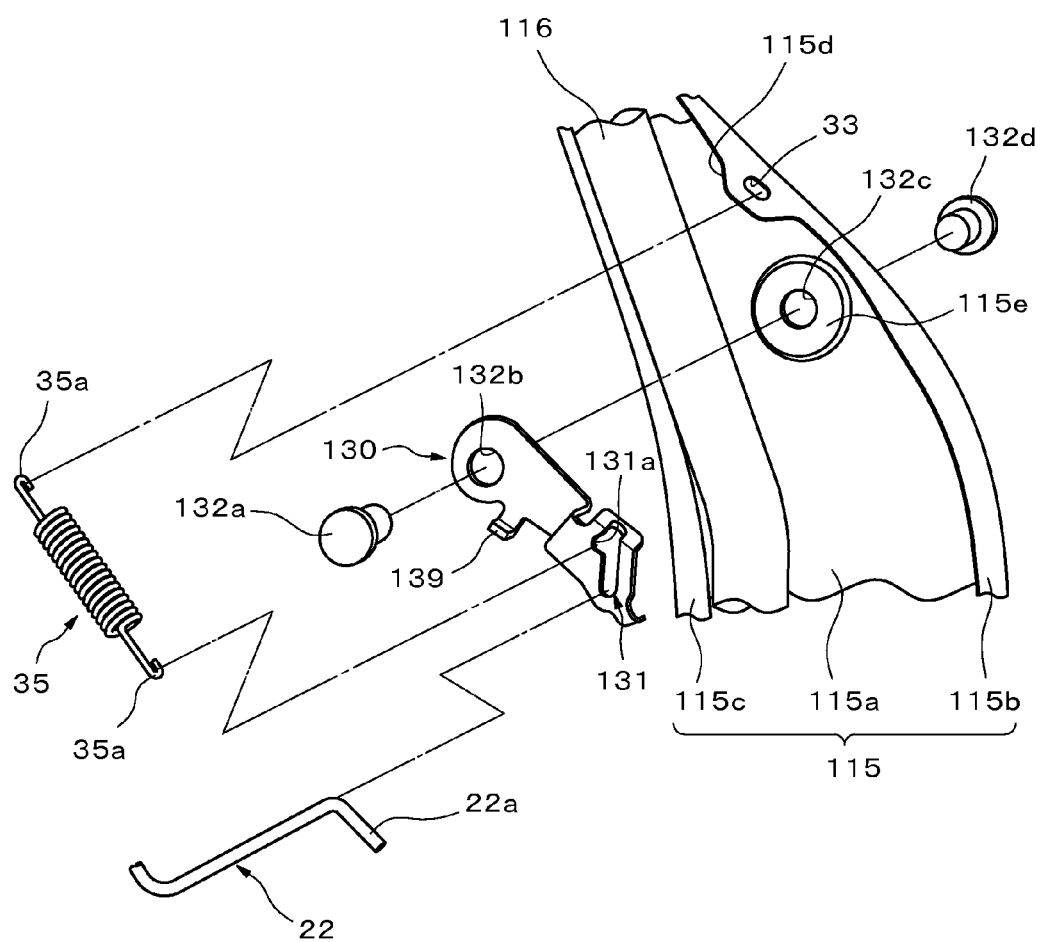
FIG. 13 is an exploded view illustrating the biasing element and the impact reduction member according to another embodiment of the present invention.

As illustrated in FIG. 13, the shaft 132 includes a shaft member 132a, a shaft hole 132b which is provided in the movement member 130, a hole portion 132c which is provided in the side plate 115a of the side frame 115, and a fitting member 132d. The shaft member 132a is inserted through the shaft hole 132b to be fitted to the hole portion 132c, and the fitting member 132d is fitted from the front end of the shaft member 132a to axially support the movement member 130 in a rotatable manner. Furthermore, the side plate 115a of the side frame 115 is provided with the convex portion 115e which is bulged inward at the position where the shaft 132 is disposed.

Then, the main pipe 116 is disposed between the convex portion 115e and the rear edge 115c of the side frame 115. With such a configuration, the main pipe 116 is disposed in a gap formed by the convex portion 115e and the rear edge 115c, and hence the space may be saved.

A Configuration and Operations of the Movement Member 130

As in the movement member 30 of the aforementioned embodiment, the movement member 130 of this embodiment includes the rotatable shaft 132, a locking portion 131 of the joint member formed at a position separated from the shaft 132 by a predetermined distance, the locking portion (locking concave portion 131a) of the biasing element, and a movement preventing portion 139 which prevents the movement (pivoting). More specifically, the movement member 130 includes a base portion 130a which makes a slide contact with the side plate 115a and the movement preventing portion 139 which protrudes from the base portion 130a and is bent to be in a raised manner formed from the side plate 115a and to abut against the main pipe 116.

A formation portion 130c of the locking portion 131 extends in the outer peripheral direction from the raised portion 130b which is in a raised manner formed to be continuous to the outer periphery of the base portion 130a constituting the movement member 130.

The locking portion (the locking concave portion 131a) of the biasing element of this embodiment is used to lock the end of the tension coil spring 35 as the biasing element, and is formed to notch a part of the locking portion 131 in the formation portion 130c provided with the locking portion 131 toward the rear side of the vehicle. Then, as illustrated in FIG. 12, the locking concave portion 131a is formed at the front side of the vehicle relative to the line Y' jointing the center of the shaft 132 and the position where the locking portion 131 hooks the wire 22.

Figure 10:
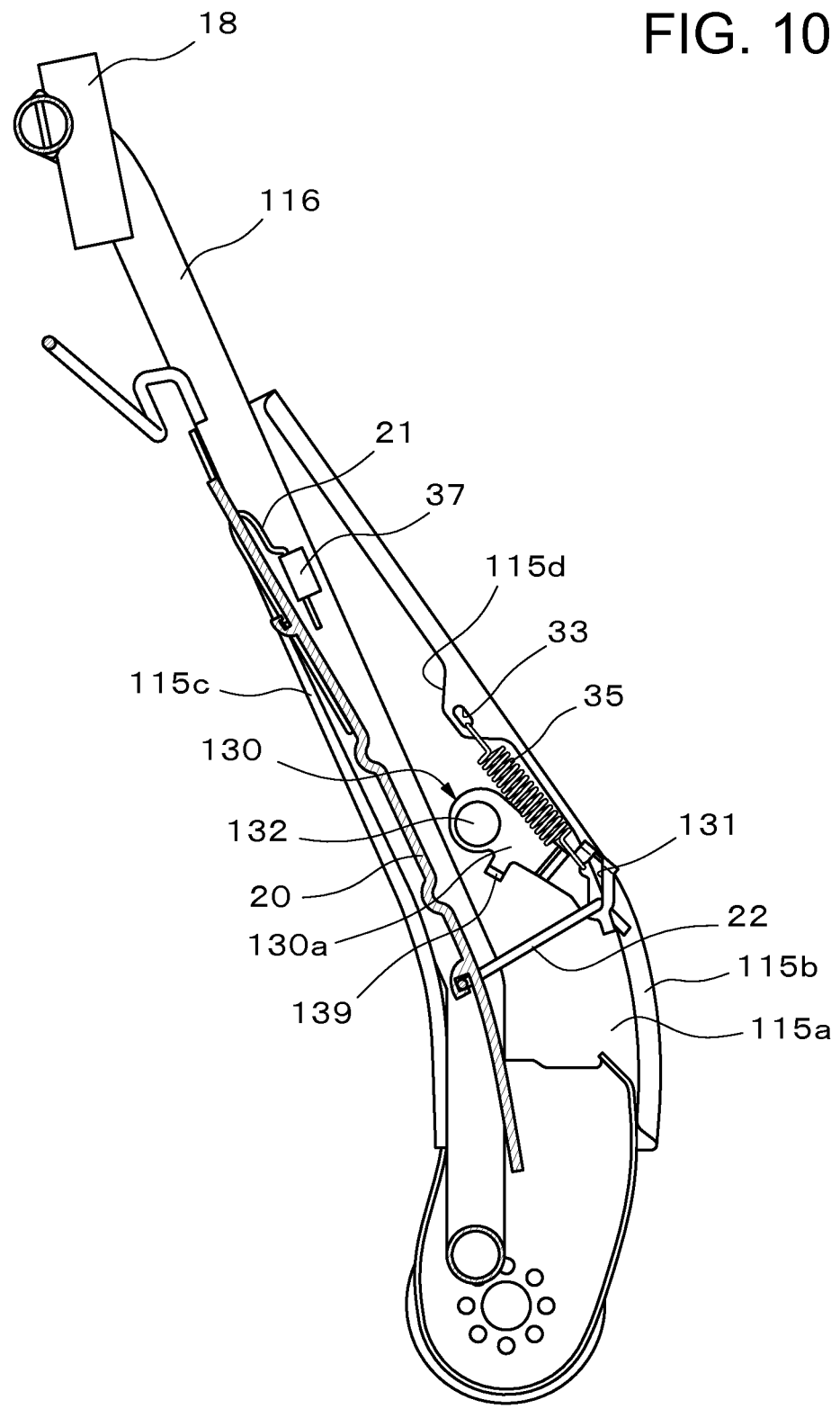
FIG. 10 is a schematic cross-sectional side view illustrating a seat back frame before an impact reduction member according to another embodiment of the present invention pivots.
Figure 11:
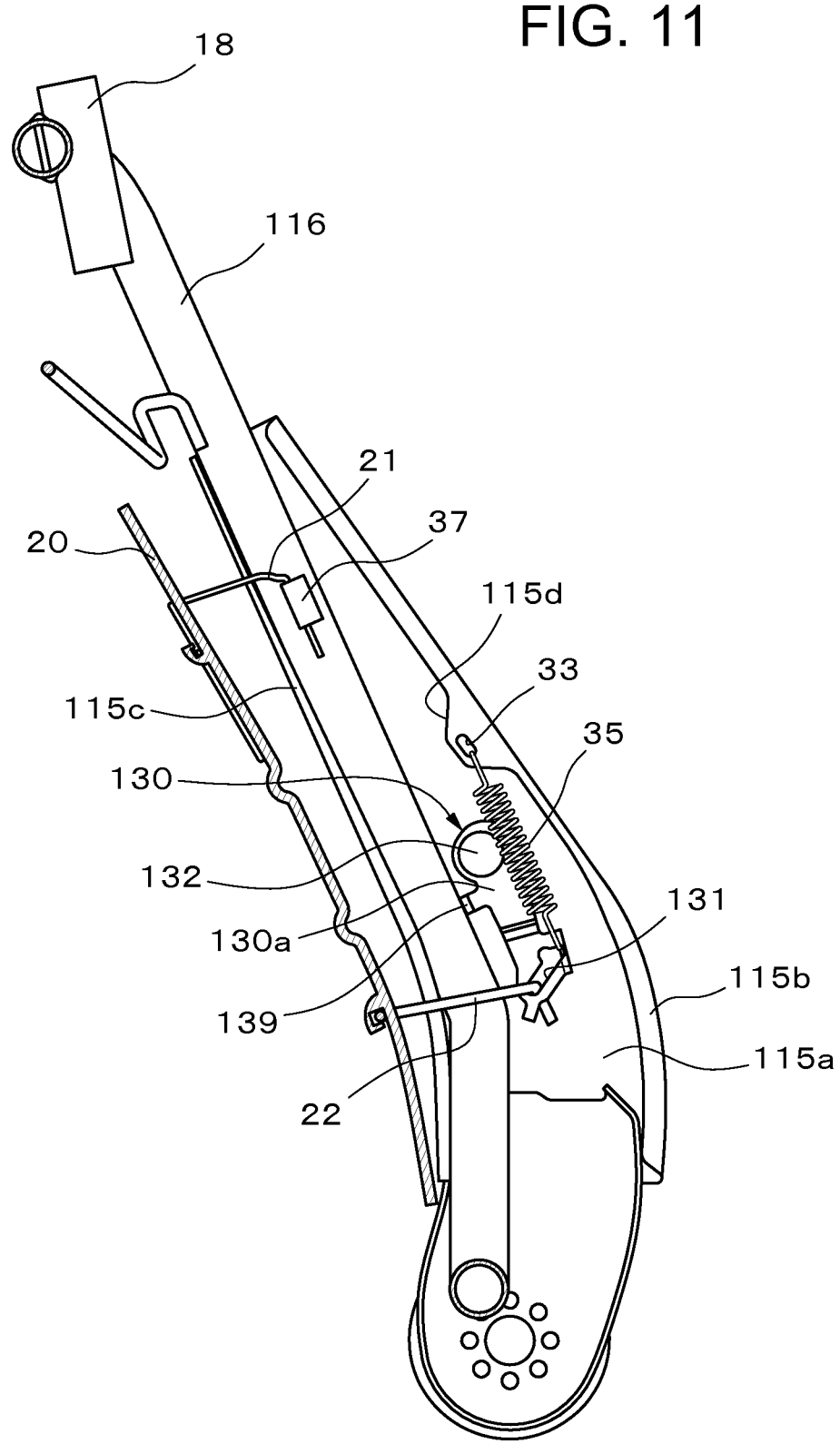
FIG. 11 is a schematic cross-sectional side view illustrating the seat back frame after the impact reduction member according to another embodiment of the present invention pivots.

The movement preventing portion 39 of this embodiment is used to prevent the movement (pivoting) of the movement member when the movement member 130 moves (pivots). As illustrated in FIGS. 10, 11, and 12, the movement preventing portion partially protrudes from the base portion 130a to be continuous to the outer periphery of the base portion 130a which makes a slide contact with the convex portion 115e formed in the side plate 115a when rotating about the shaft 132 and is further in a raised manner formed in a direction separated from the side plate 115a, that is, a direction substantially perpendicular to the base portion 130a. The movement preventing portion 39 regulates the movement (pivoting) of the movement member 130.

Figure 12:
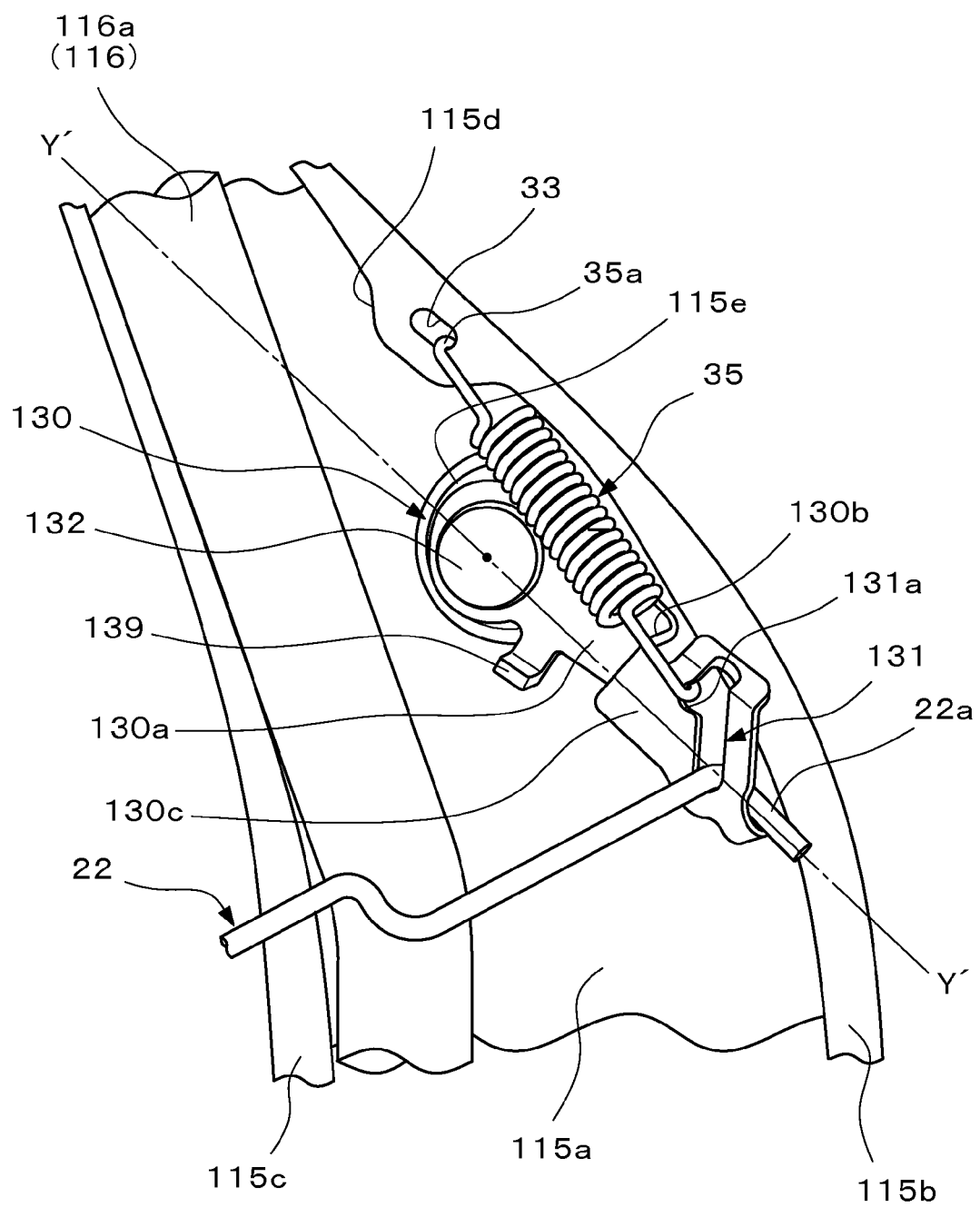
FIG. 12 is an enlarged side view illustrating a relation between a biasing element and the impact reduction member according to another embodiment of the present invention.

Specifically, as illustrated in FIG. 12, the movement preventing portion 39 is in a raised manner formed to be bent in a direction separated from the side plate 115a of the side frame 115 (inward in the lateral direction of the seat back frame 1').

Each movement preventing portion 39 is an abutting portion which abuts against the main pipe 116 to prevent the movement (pivoting) of the movement member after the movement member 130 moves (pivots). Then, the height of the end of the movement preventing portion 39 abutting against the main pipe 116 at the inside of the seat is formed so that the end abuts against the surface of the main pipe 116 in the abutting state.

Further, the height of the end of the movement preventing portion 39 at the inside of the seat may be disposed at the inside relative to the center axis (the line X' of FIG. 16) of the main pipe 116. In this way, since the movement preventing portion 39 reliably abuts against the surface of the main pipe 116, the movement of the movement member 130 may be stably controlled.

The movement preventing portion 39 is provided to regulate the set movement (pivoting) range of the movement member 130, and the range is set such that the movement preventing portion 39 abuts against the main pipe 116 to stop the movement (pivoting) when the movement member 130 moves (pivots) by the occupant's load in the event of rear end collision.

In this way, the movement preventing portion 39 of the movement member 130 is integrally formed by extending the movement member 130 in the outer peripheral direction, and the abutting surface abuts against the main pipe 116 after the movement (pivoting). Accordingly, the number of components may be decreased, and the movement (pivoting) of the movement member 130 may be stably and reliably stopped by the simple configuration of ensuring the strength.

The movement preventing portion 39 is formed at a position where the movement preventing portion does not interfere with the joint member (the wire 22) or the biasing element (the tension coil spring 35) to be described later.

Furthermore, in this embodiment, the movement preventing portion 39 of the movement member 130 directly abuts against the main pipe 116 to prevent the movement (pivoting) of the movement member. However, a sound absorbing member such as a rubber element having a thickness that does not disturb the stable stopping of the movement (pivoting) of the movement member 130 may be attached between the movement preventing portion 39 and the main pipe 116 to prevent abnormal noise generated by the abutting operation. With such a configuration, the movement (pivoting) may stably be prevented and a sound absorbing effect may be expected.

Figure 14:
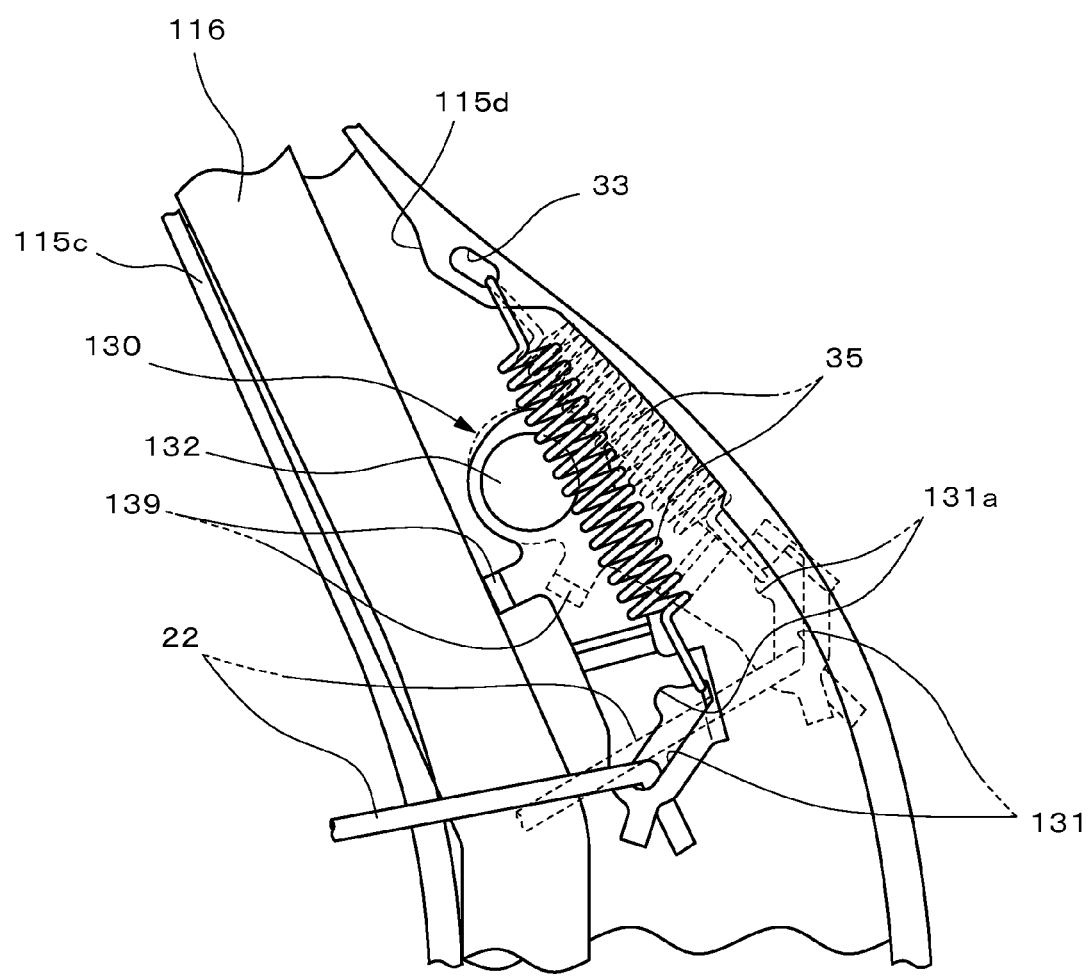
FIG. 14 is a side view diagram illustrating a state of the biasing element and the impact reduction member according to another embodiment of the present invention before and after rear end collision occurs.

With regard to the movement member 130 in the event of rear end collision, FIG. 10 illustrates a state before the impact reduction member pivots and FIG. 11 illustrates a state after the impact reduction member pivots, where the dashed line of FIG. 14 indicates a state before the rear end collision occurs and the solid line thereof indicates a state after the rear end collision occurs. As illustrated in FIG. 14, when the occupant moves rearward due to the inertia force while receiving an impact from the rear side in the event of the rear end collision, a tension is generated in a direction in which the load moves (pivots) the movement member 130 rearward (leftward in FIG. 14) through the pressure receiving member 20 (not illustrated in FIG. 14) and the wire 22 locked to the pressure receiving member 20. The tension generated at this time becomes a sufficient load for extending the tension coil spring 35 holding the movement member 130 at the initial position and moving (rotating) the movement member 130 rearward.

Furthermore, in this embodiment, an example is illustrated in which the movement members 130 are provided in both right and left side frames 115, but the movement member may be provided only in the side frame 115 provided with the load input member 40. In this case, the joint members (the wires) 21 and 22 may directly be locked to the side frame 115 without the movement member 130.

A Configuration and Operations of the Load Input Member 40

Figure 9:
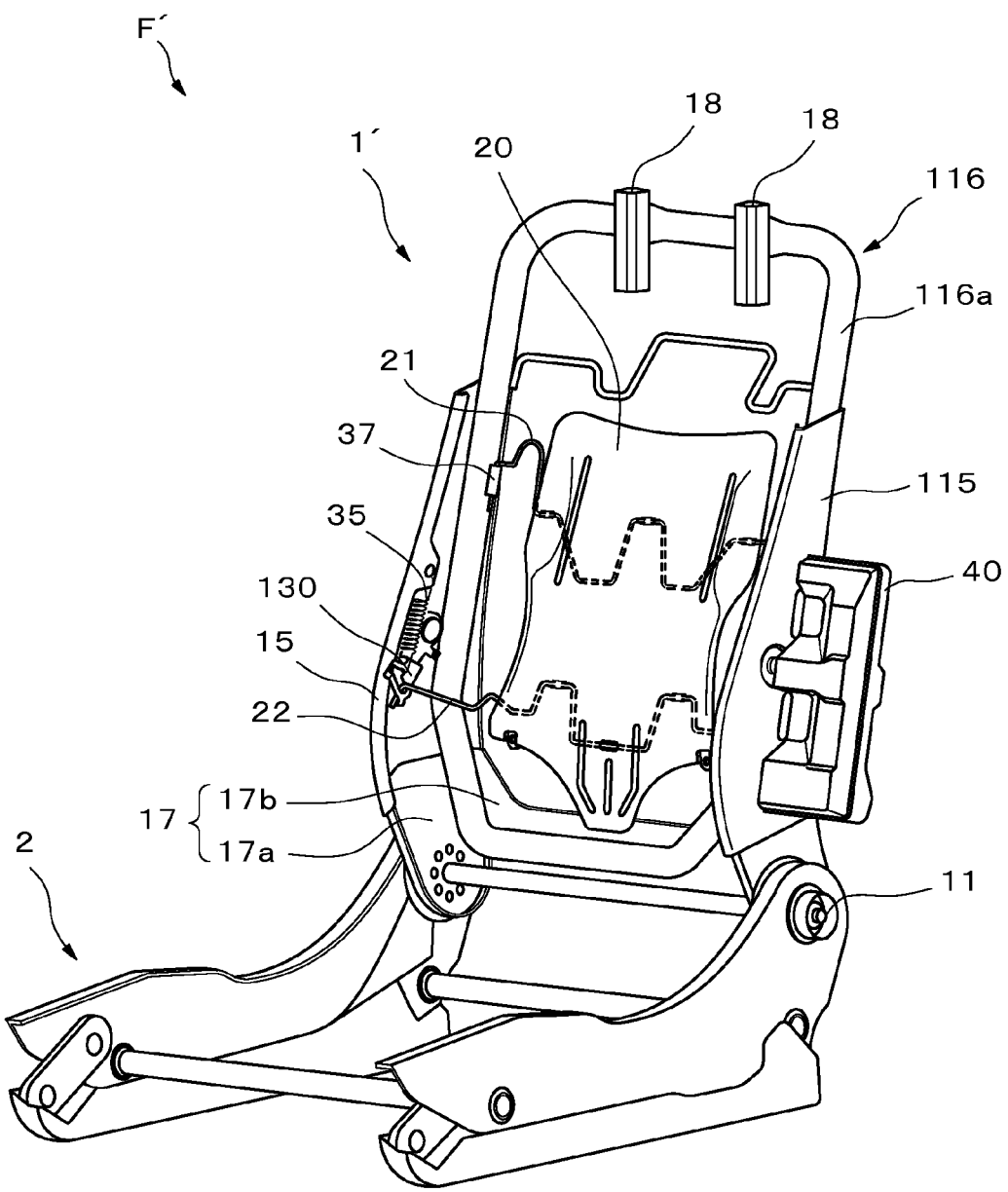
FIG. 9 is a schematic perspective view of a seat frame according to another embodiment of the present invention.

The load input member 40 which receives the load generated by the side collision is bonded to a position at the side of the seat back frame 1 provided with the movement member 130 having the aforementioned configuration (more specifically, the outside of the side frame 115) and the side of the vehicle door (the right side of FIG. 9).

The load input member 40 is disposed to receive the load generated by the side collision and further transmit the load to the other members constituting the seat frame F', such as the side frame 115 and the main pipe 116.

Accordingly, the vehicle seat S may not only improve the rigidity relative to the load generated by the side collision by the main pipe 116 which is provided above the side frame 115 and extends to the downside of the side frame 115, but also effectively transmit the load generated by the side collision to the vehicle body relative to the other members constituting the seat frame F' by further providing the load input member 40.

Furthermore, in this embodiment, the load input member 40 is used as a member that receives the load generated by the side collision of the vehicle, but the invention is not limited thereto. That is, a member may be used which receives a load from the occupant as in an armrest attachment member that is disposed to attach an armrest thereto, a member may be used which receives a load from an airbag when an airbag unit is operated as in an airbag attachment member, and a member may be used which receives a load by an attachment member using the own weight as in a motor.

As illustrated in FIG. 15, the load input member 40 includes a first plate member 41 and a second plate member 42 which are separated from each other to face each other in the front and rear direction and are bonded to each other. The first plate member 41 which is disposed at the front side of the vehicle includes an upper edge 41b which is bent rearward in an L-shape from the upper end of the front plate 41a, a side edge 41c which is bent rearward in an L-shape from the opposite side end relative to the side frame 115 in the front plate 41a, and a lower edge 41d which is bent rearward in an L-shape from the lower end of the front plate 41a.

The second plate member 42 which is disposed at the rear side of the vehicle includes an upper edge 42b which is bent forward in an L-shape from the upper end of the rear plate 42a to overlap each edge of the first plate member 41, a side edge 42c which is bent forward in an L-shape from the opposite side end relative to the side frame 115 in the rear plate 42a, and a lower edge 42d which is bent forward in an L-shape from the lower end of the rear plate 42a.

Then, the upper edge 41b, the side edge 41c, and the lower edge 41d of the first plate member 41 are respectively bonded to the upper edge 42b, the side edge 42c, and the lower edge 42d of the second plate member 42 in an overlapping state.

The load input member 40 of this embodiment is bonded to the side frame 115 and the main pipe 116 partially protruding from the side frame 115 to be formed in a casing structure closed in four directions, thereby improving the durability to the load applied in the lateral direction. Further, since the load input member 40 is directly bonded to the main pipe 116, when the load is applied in the lateral direction, the load may be distributed by twisting the main pipe 116.

The load input member 40 is disposed in the side frame 115 so that the rear edge 115c of the side frame 115 and the rear plate 42a of the load input member 40 face each other and are continuous to each other in a substantially flush state. With such a configuration, the attachment rigidity of the load input member 40 is improved, and the load may be further easily transmitted in the lateral direction. Furthermore, in this embodiment, a configuration is illustrated in which the rear edge 115c and the rear plate 42a face each other and are substantially flush with each other. However, a configuration may be adopted in which the front edge 115b and the front plate 41a face each other to be substantially flush with each other and a configuration may be adopted in which the front edge 115b and the rear edge 115c face the front plate 41a and the rear plate 42a to be substantially flush with each other.

The front plate 41a of the first plate member 41 is provided with a concave portion 41e and a bulged portion 41g, and the rear plate 42a of the second plate member 42 is provided with a concave portion 42e and a bulged portion 42g. Since a concavo-convex structure is formed on the surface of the load input member 40 by this structure, the load input member 40 may improve the strength relative to the load generated by the side collision. Then, the concave portion 41e and the concave portion 42e which form the concavo-convex structure are provided at a position where the concave portions face each other, and the surfaces of the concave portion 41e and the concave portion 42e are bonded to each other (see FIG. 16). Compared to the case where the concave portions 41e and 42e are not bonded to each other, when the concave portions 41e and 42e are bonded to each other, the same strength may be ensured even when the plate thickness is thinned. Accordingly, the vehicle seat S may be decreased in weight.

Further, the front plate 41a of the first plate member 41 and the rear plate 42a of the second plate member 42 are respectively provided with holes 41f and 42f. The shapes of the holes 41f and 42f are not particularly limited, but the load input member 40 may be decreased in weight by cutting the holes 41f and 42f. Further, since the inside of the load input member 40 (the side of the side frame 115) may be seen through the holes 41f and 42f, the movement member 130, to be described later, may be easily installed. Furthermore, in order to ensure the strength to the load applied in the lateral direction, it is preferable that the holes 41f and 42f be formed to avoid the ends of the first plate member 41 and the second plate member 42 abutting against the side frame 115 or the main pipe 116. Furthermore, the holes 41f and 42f may be provided in a plurality of positions in the first plate member 41 and the second plate member 42.

Then, in the side frame 115, the movement member 130 is disposed at a position which is at the surface opposite to the surface bonded to the load input member 40 having the aforementioned configuration and is close to the load input member 40. The shaft 132 which serves as the pivoting shaft of the movement member 130 is disposed to be positioned at the shaft hole 132b provided in the side frame 115. At this time, as illustrated in FIG. 16, at least a part of the movement member 130 is disposed at a position where it partially overlaps with the load input member 40 in the lateral direction. Specifically, the shaft 132 (more specifically, at least one of the shaft member 132a and the fitting member 132d) is disposed to partially overlap with the load input member 40 in the direction of the pivoting shaft. Furthermore, in this embodiment, the shaft 132 is disposed to partially overlap with the front plate 41a of the load input member 40. With this configuration, the shaft 132 and the load input member 40 are disposed to overlap with each other in the lateral direction of the vehicle, and hence the space may be saved. Furthermore, in this embodiment, an example is illustrated in which a part of the shaft 132 overlaps with the front plate 41a, but a part of the shaft may overlap with the rear plate 42a.

Then, when the shaft 132 is disposed to overlap with the front plate 41a of the load input member 40, it is preferable for a part thereof to be disposed in front of the front plate 41a. Alternatively, when the shaft 132 is disposed to overlap with the rear plate 42a of the load input member 40, it is preferable for a part thereof to be disposed rearward relative to the rear plate 42a. With such an arrangement, the installation state of the shaft 132 may visibly be checked even after installing the shaft 132 and the load input member 40 relative to the seat back frame 1.

Further, the shaft 132 (more specifically, the fitting member 132d) is fitted into the convex portion 115e by a configuration in which the convex portion 115e that is bulged toward the inside of the side frame 115 is formed at the installation position of the shaft 132 in the side frame 115 as in FIG. 16. Accordingly, the fitting member 132d is disposed not to abut against the front plate 41a (or the rear plate 42a) of the load input member 40 and the load input member 40 is not disposed at a position close to the vehicle door, thereby saving the space.

Further, the installation position of the shaft 132 may be a position which is completely included inside the load input member 40. Specifically, the shaft 132 may be disposed between the front plate 41a and the rear plate 42a of the load input member 40. With such a configuration, the space may be saved in the installation of the shaft 132, and the fitting member 132d of the shaft 132 is protected by the load input member 40, thereby improving the attachment strength of the movement member 130.

As described above, the front plate 41a and the rear plate 42a are respectively provided with the concave portions 41e and 42e. The bulged portion 41e and the bulged portion 42e of which the width increases forward or rearward are respectively formed between the concave portion 41e and the concave portion 42e arranged at a plurality of positions in the vertical direction in the front plate 41a and the rear plate 42a. Furthermore, the bulged portion may be provided in any one of the front plate 41a and the rear plate 42a. In this way, since the load input member 40 may receive the load applied in the lateral direction through the ridge portion by forming the bulged portions 41g and 42g and the concave portions 41e and 42e, the rigidity is further improved.

The shaft 132 is disposed inside the bulged portion 41g and the bulged portion 42g, that is, a space formed by the bulged portion 41g and the bulged portion 42g. In this way, since the shaft 132 is included inside a space formed by the bulged portions 41g and 42g, the pivoting structure of the shaft 132 does not increase without wasting the space.

In addition, at least a part of the movement member 130 may be disposed at a position where it does not overlap with the load input member 40 in the lateral direction. Specifically, when the installation position of the shaft 132 is near the load input member 40, the shaft 132 (more specifically, at least one of the shaft member 132a and the fitting member 132d) may be disposed at a position where it is separated from the load input member 40 in a non-overlapping state in the direction of the pivoting shaft. With such a configuration, since the shaft 132 is provided outside the load input member 40 formed by a casing, the installation of the shaft 132 is not disturbed by the load input member 40, and hence the workability is improved. Further, since the operator may see the shaft 132 without the interruption of the load input member 40, the installation state of the shaft 132 may be checked. Furthermore, the shaft 132 may be disposed forward relative to the front plate 41a and may be disposed rearward relative to the rear plate 42a.

Furthermore, in the aforementioned embodiment, the seat back S1 of the front seat of the automobile is described as the specific example, but the invention is not limited thereto. The same configuration may be, of course, applied to the seat back of the rear seat.

| TABLE OF REFERENCE NUMERALS | |
|---|---|
| S | vehicle seat |
| S1 | seat back |
| S2 | seat base |
| S3 | headrest |
| F, F' | seat frame |
| 1, 1' | seat back frame |
| 2 | seat base frame |
| 1a, 2a, 3a | cushion pad (pad material) |
| 1b, 2b, 3b | outer layer material |
| 11 | reclining mechanism |
| 15, 115 | side frame (side portion) |
| 15a, 115a | side plate |
| 15b, 115b | front edge |
| 15c, 115c | rear edge |
| 15d, 115d | protrusion portion |
| 15e, 115e | convex portion |
| 15f | slope portion |
| 15g | stopper portion |
| 15h | hole |
| 15i | planar portion |
| 16 | upper frame (upper portion) |
| 16a | side surface portion |
| 116 | main pipe (frame member) |
| 116a | side surface portion |
| 17 | lower frame (lower portion) |
| 17a | elongated portion |
| 17b | intermediate portion |
| 18 | pillar support portion |
| 19 | headrest pillar |

-continued

TABLE OF REFERENCE NUMERALS

| | |
|---|---|
| 20 | pressure receiving member |
| 21, 22 | wire (joint member) |
| 22a | hook portion (hook end) |
| 30, 130 | movement member (impact reduction member) |
| 30a, 130a | base portion |
| 30b | first raised portion |
| 30c, 130c | formation portion |
| 30d | second raised portion |
| 130b | raised portion |
| 31, 131 | locking portion |
| 31a, 131a | locking concave portion |
| 32, 132 | shaft |
| 32a, 132a | shaft member |
| 32b, 132b | shaft hole |
| 32c, 132c | hole portion |
| 32d, 132d | fitting member |
| 33 | locking hole |
| 34 | pivoting suppressing portion |
| 35 | tension coil spring (biasing element) |
| 35a | hook |
| 37 | attachment hook |
| 38 | protruded piece |
| 38a | contact portion |
| 39 | movement preventing portion |
| 40 | load input member |
| 41 | first plate member |
| 41a | front plate |
| 41b | upper edge |
| 41c | side edge |
| 41d | lower edge |
| 41e | concave portion |
| 41f | hole |
| 41g | bulged portion |
| 42 | second plate member |
| 42a | rear plate |
| 42b | upper edge |
| 42c | side edge |
| 42d | lower edge |
| 42e | concave portion |
| 42f | hole |
| 42g | bulged portion |

The invention claimed is:

1. A vehicle seat comprising:
a seat back frame that includes a side portion positioned at the side thereof;
a pressure receiving member that is jointed to the seat back frame through a joint member and supports an occupant; and
an impact reduction member that is disposed on at least one side of the side portion and engages with the joint member to be movable when a predetermined amount of impact load is applied to the pressure receiving member and causes the pressure receiving member to move rearward;
wherein:
the side portion comprises:
a flat side plate;
a front edge which is bent inwardly in a lateral direction from a front end of the side plate; and
a rear edge which is bent inwardly from a rear end of the side plate;
a convex portion which is:
provided on the side plate;
separated from the front edge and the rear edge; and
bulged in a movement range of the impact reduction member; and
the impact reduction member comprises:
a base portion which makes a slide contact with the side plate; and
a protruded piece which:
protrudes from the base portion toward the side plate in a seat right-to-left direction; and
comprises a contact portion for contacting and engaging with the convex portion that extends in the seat right-to-left direction.

2. The vehicle seat according to claim 1, wherein:
the convex portion includes a slope portion which is formed inwardly in a raised manner in the lateral direction from the side plate; and
a part of the slope portion is formed to be continuous to the front edge or the rear edge.

3. The vehicle seat according to claim 1, wherein:
a stopper portion which is formed by an elongated hole is formed at an engagement portion with the protruded piece in the convex portion.

4. The vehicle seat according to claim 3, wherein:
the convex portion further includes a hole which is separated from the stopper portion.

5. The vehicle seat according to claim 1, wherein:
the convex portion includes a planar portion which is perpendicular to the movement range of the impact reduction member; and
the impact reduction member is disposed to abut against the planar portion.

6. The vehicle seat according to claim 1, wherein:
the impact reduction member further comprises:
a locking portion on which the joint member hooks; and
a pivoting suppressing portion which abuts against the joint member to suppress a pivoting of the joint member.

7. The vehicle seat according to claim 6, wherein:
the joint member includes a hook end which is formed by bending one end which is hooked to the impact reduction member;
the locking portion is formed by an elongated hole through which the hook end is inserted; and
the pivoting suppressing portion abuts against the hook end.

8. The vehicle seat according to claim 6, wherein:
the pivoting suppressing portion protrudes from a formation portion provided with the locking portion.

9. The vehicle seat according to claim 7, wherein:
the pivoting suppressing portion is bent toward the hook end.

10. The vehicle seat according to claim 7, wherein:
the pivoting suppressing portion is formed relative to the hook end to be formed at a pivoting side of the hook end upon the movement of the impact reduction member.

11. The vehicle seat according to claim 1, wherein:
the seat back frame further includes a frame member that joints upper parts of the side portion to each other and is disposed along the side portion in a vertical direction in an overlapped manner therewith; and
the impact reduction member abuts against the frame member so that the movement thereof is prevented.

12. The vehicle seat according to claim 11, wherein:
an impact reduction member comprises:
a base portion which makes a slide contact with the side plate; and
a movement preventing portion which protrudes from the base portion to be bent in a raised manner from the side plate and abut against the frame member.

13. The vehicle seat according to claim 11, wherein:
the frame member is formed by a member having a closed cross-section.

14. The vehicle seat according to claim 12, wherein:
the frame member is formed by a tubular member having a circular cross-section; and
the movement preventing portion extends inwardly in a lateral direction relative to a center axis of the tubular member disposed along the side portion after the movement of the impact reduction member.

15. The vehicle seat according to claim 11, further comprising:
a load input member that is disposed at a side of the seat back frame;
wherein:
a part of the load input member is disposed at a position facing the front edge or the rear edge.

16. The vehicle seat according to claim 1, wherein:
the convex portion comprises an elongated hole; and
the movement of the impact reduction member is prevented when the impact reduction member contacts a periphery of the elongated hole.

\* \* \* \* \*